United States Patent [19]
Land et al.

[11] 3,806,245
[45] Apr. 23, 1974

[54] PHOTOGRAPHIC FILM CASSETTE COMPRISING INTERNALLY PROGRAMMED SELF-CONTAINED FILM PROCESSING SYSTEM

[75] Inventors: Edwin H. Land, Cambridge; John F. Batter, Jr., Lincoln, both of Mass.

[73] Assignee: Polaroid Corporation, Cambridge, Mass.

[22] Filed: Feb. 17, 1972

[21] Appl. No.: 227,170

[52] U.S. Cl.................... 352/130, 95/89 R, 95/13, 352/78
[51] Int. Cl............................................ F21v 17/06
[58] Field of Search........... 352/72, 78, 130; 95/89, 95/94, 13, 14

[56] References Cited
UNITED STATES PATENTS

| | | | |
|---|---|---|---|
| 3,623,417 | 11/1971 | Eloranta et al. | 95/13 X |
| 3,667,361 | 6/1972 | Meggs et al. | 95/13 |
| 2,435,718 | 2/1948 | Land | 95/13 |
| 2,558,858 | 7/1951 | Land | 95/13 |
| 2,520,641 | 8/1950 | Land | 95/13 |
| 2,966,103 | 12/1960 | Erikson | 95/13 |
| 3,608,455 | 9/1971 | Downey | 95/13 |
| 3,641,896 | 2/1972 | Downey et al. | 95/13 |

*Primary Examiner*—Richard M. Sheer

[57] ABSTRACT

A photographic film cassette comprising externally powered film takeup and supply reels. A strip of initially unexposed film is stored on the supply reel and passes to the takeup reel by way of a film gate, for exposure of the film, under camera control. The cassette includes a housing enclosing the supply and takeup reels and a processing system including a supply of film composition for processing the film after its exposure. The processing system responds to the position and direction of motion of the film to process it during its first rewind onto the supply spool, in an operating sequence determined by elements within the cassette housing that cause the processor to engage the film, release the processing composition, coat the film, and then disengage the processor.

47 Claims, 29 Drawing Figures

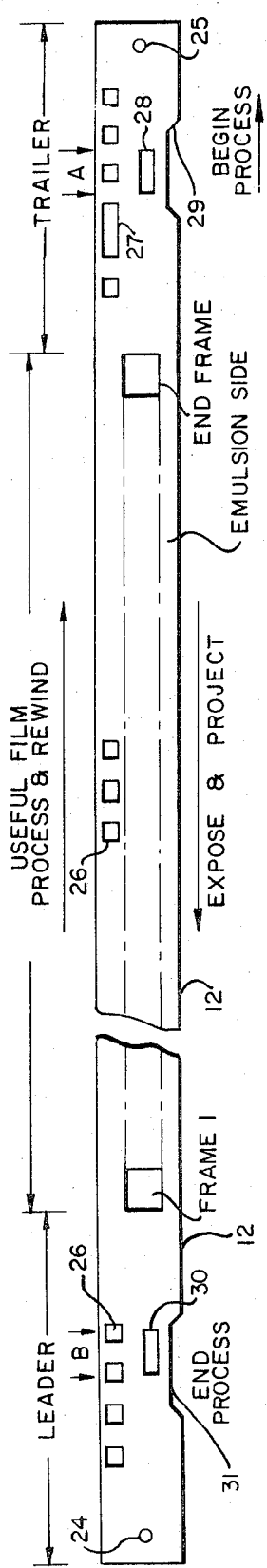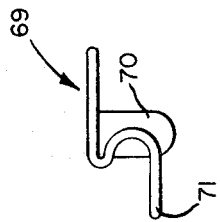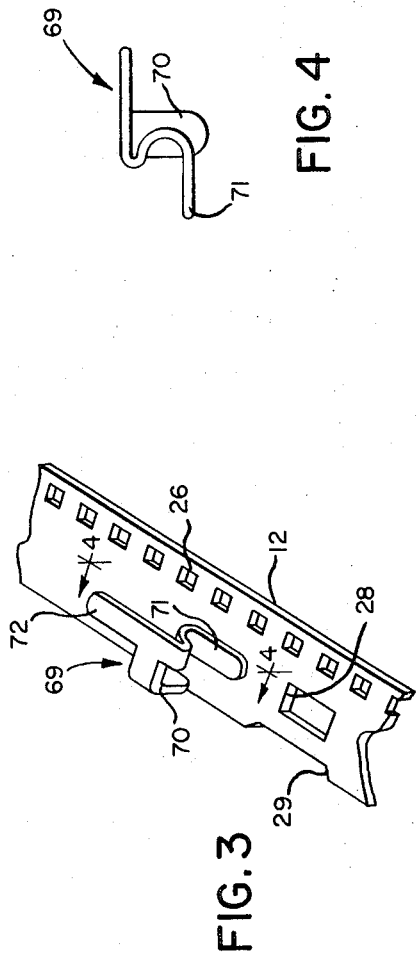

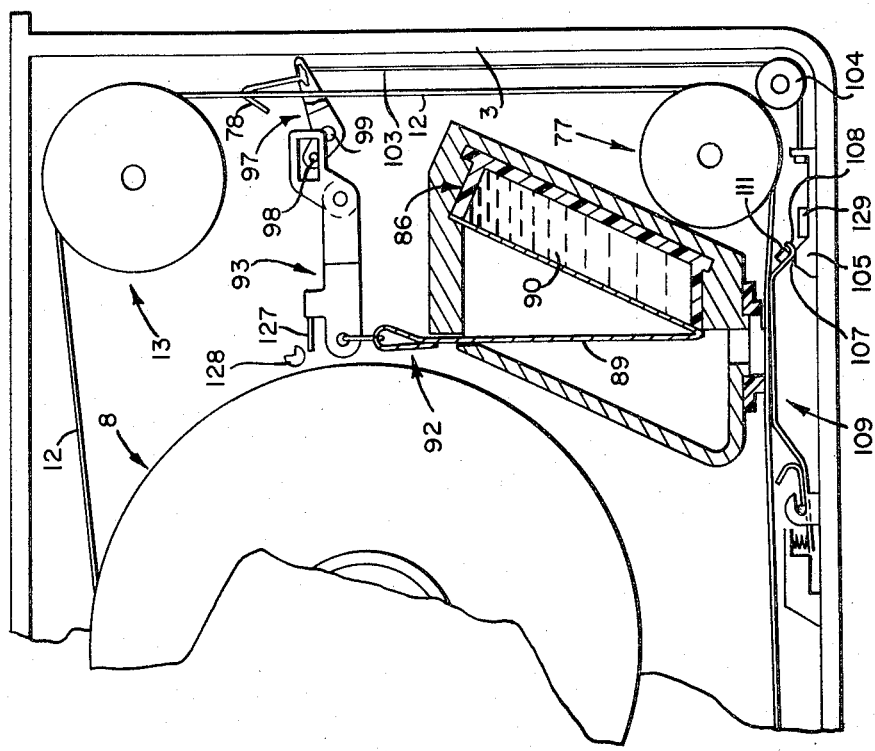

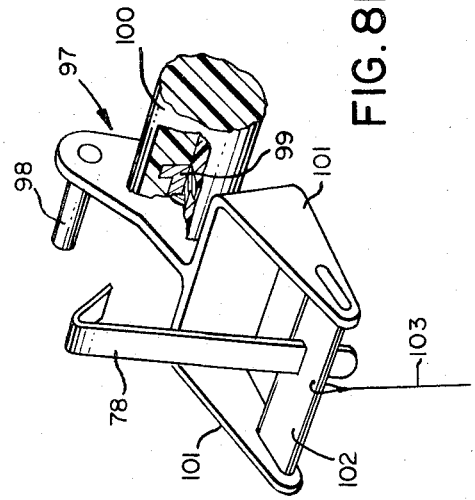
FIG. 8B
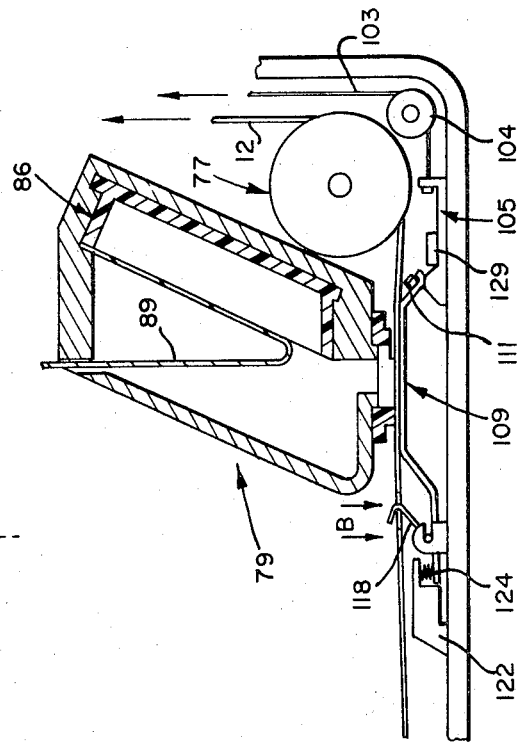
FIG. 12
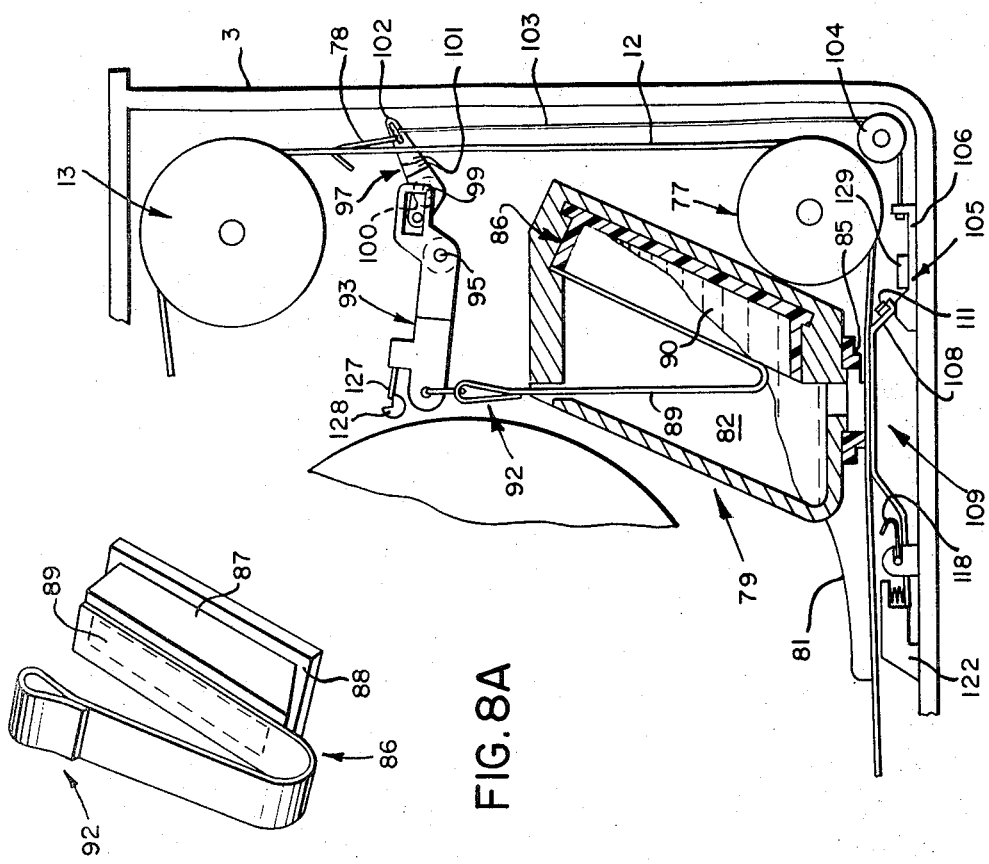
FIG. 8A
FIG. 11

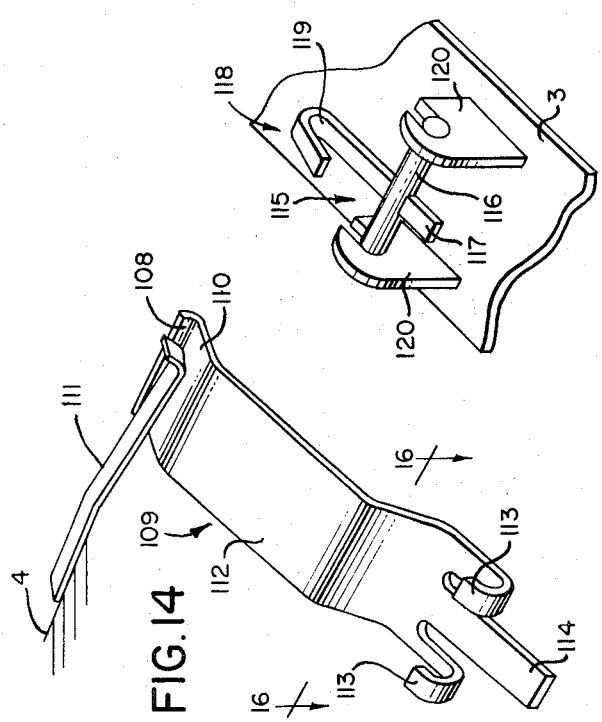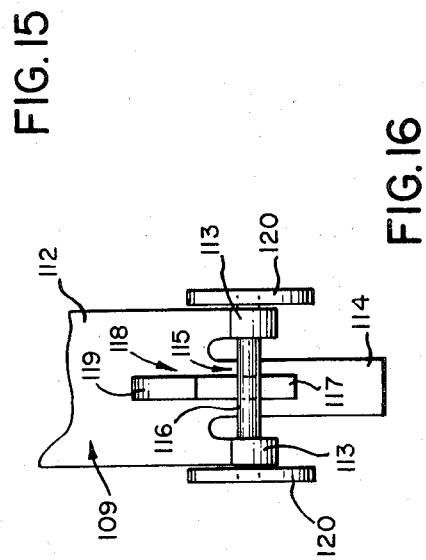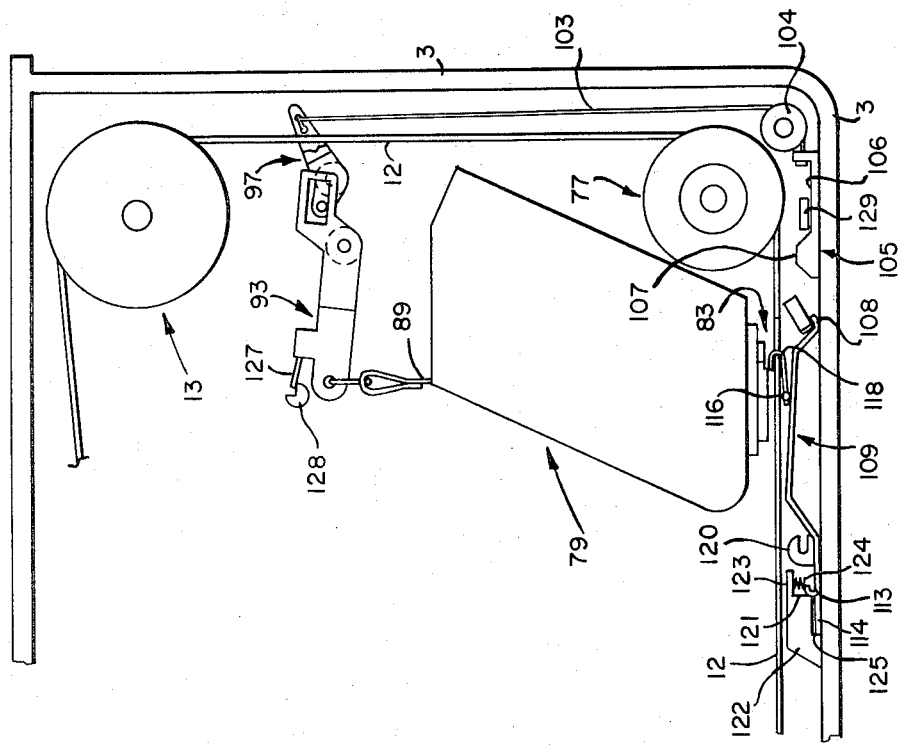

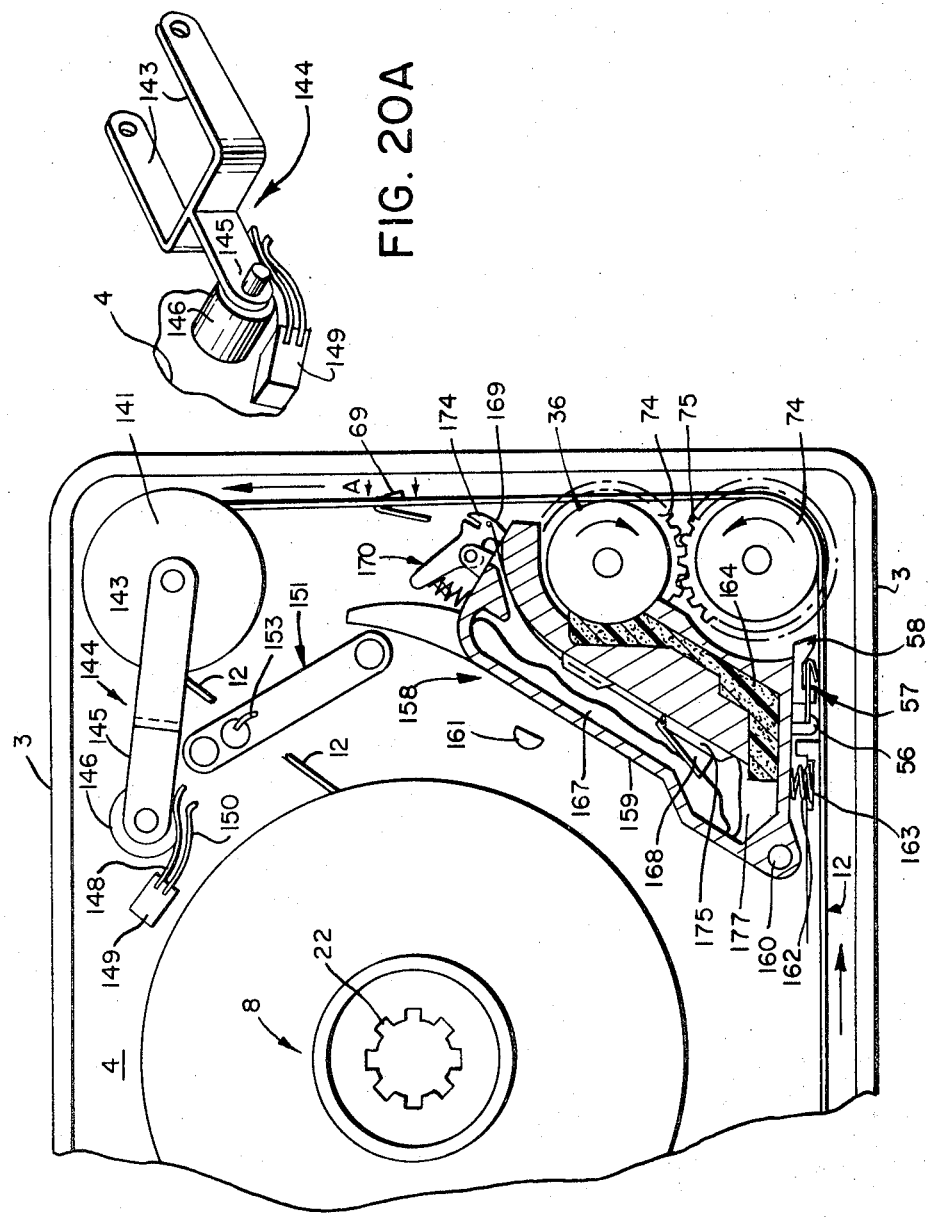

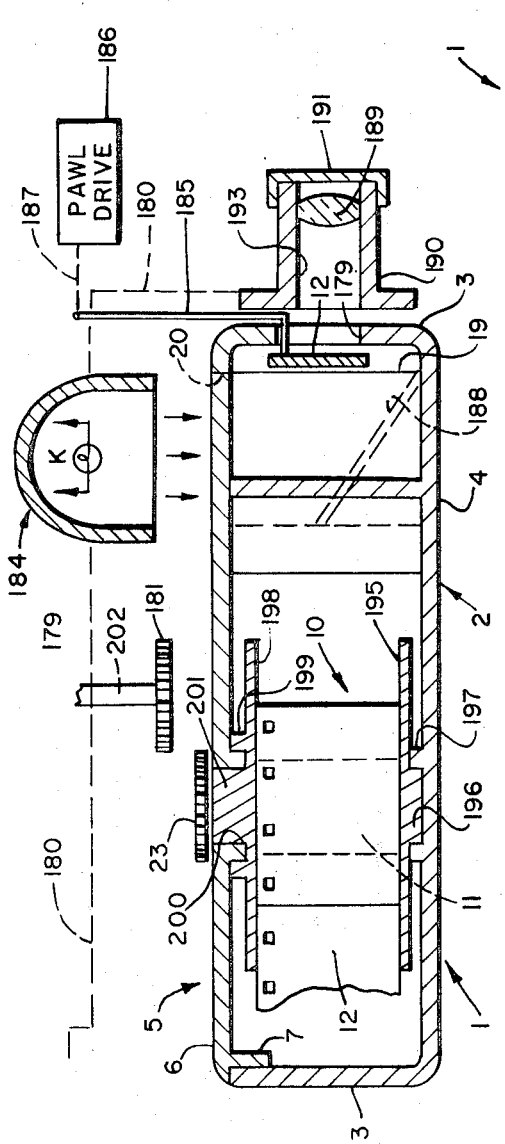

PHOTOGRAPHIC FILM CASSETTE COMPRISING INTERNALLY PROGRAMMED SELF-CONTAINED FILM PROCESSING SYSTEM

Our invention relates to photographic apparatus, and particularly to a novel film cassette comprising an internally programmed self-contained film processing system.

Extensive efforts have been made to simplify the apparatus required for photography and to reduce the time and effort required to secure finished photographs and transparencies. A significant factor in the reduction of the time required to secure finished results has been the widely used photographic systems in which photofinishing compositions are packaged with the film used to record the original image, so that a finished photographic image may be produced within a minute or less from the time of exposure.

A significant development along these lines that is particularly applicable to the production of processed motion picture film has been the invention and development of photographic film cassettes, including both a roll of film and the chemicals for processing the roll after exposure in a camera. Prior to our invention, processing of the film in such cassettes has required either manual operations or the use of external mechanisms connected to the cassette that cause the processing operation to be carried out within the cassette in the proper sequence.

Manual manipulation of the film processing operation is undesirable, because of the uncertain results inherent in requiring the operator to judge the various forces needed to carry out the processing operations, and the rate at which the process should be carried out. Mechanisms previously developed for external programming of the film processing operation on such cassettes have generally involved rather bulky apparatus, because of the requirements for external connections to the cassette. Such external connections demand exposed parts, which must be of relatively rugged construction for reliable operation over a useful service life. And the forces applied to, and by, such rugged apparatus tend to be large compared with the forces actuallly required for processing the film.

The object of our invention is to simplify the external apparatus required to mainpulate a film cassette containing its own film processing system, while reducing the energy requirements on the processing system and thereby making it possible to utilize a more compact and lighter weight construction than was formerly deemed practical.

The above and other objects of our invention are attained by means of a novel cassette construction that inherently requires only those energy inputs normally associated with the exposure of unprocessed film and the projection and rewinding of processed film. Such a cassette comprises an external housing of opaque material, formed with a film gate. Takeup and supply reels are rotatably mounted in the housing, and adapted for connection to external drive means. A supply of strip film is connected at its ends to the reels, and passes therebetween through the film gate for cooperation with a camera and projector.

The film is provided with sprocket holes, so that the portion exposed through the film gate can be engaged by the film advance pawl of either a camera or a projector, for incremental advance of the film. Initially, the film is unexposed, and disposed primarily on the supply reel. In the camera, the film is exposed by advancement from the supply reel to the takeup reel.

Following exposure, the supply reel is rotated to rewind the film. During the first such rewind following exposure, the film is processed by a processing system contained within the cassette housing and programmed for sequential operation by means responsive to the manipulation of the film in the housing.

More specifically, the processing system comprises a container of processing composition that is initially sealed, and which is opened to release the composition into a film coating device. The film coater engages the film and applies the released film processing composition to it in a uniform coat while the film is rewound onto the supply roll at a selected processing speed.

When the film is substantially completely rewound onto the supply reel, the film processing apparatus is disengaged from the film, and thereafter remains inactive. As will appear, the construction is such that only relatively small control forces, exerted by apparatus within the cassette housing, are required to cause the processor to sequence properly through its cycle of operation, and thereafter disengage the film.

The apparatus of our invention, and its mode of construction and operation, will best be understood by those skilled in the art upon reading the following detailed description, together with the accompanying drawings, of various illustrative embodiments thereof.

In the drawings,

FIG. 2 is a schematic plan view, with parts broken away, of a strip of photographic film useful in the cassette of FIG. 1;

FIG. 3 is a fragmentary schematic perspective sketch of a detail of the apparatus of FIG. 1, showing the relationship of a film engaging hook to a fragment of the film of FIG. 2;

FIG. 4 is a schematic elevational sketch of the hook shown in FIG. 3, taken substantially along the lines 4—4 in FIG. 3;

FIG. 8a is a fragmentary perspective sketch of a portion of the apparatus of FIG. 8;

FIG. 8b is a fragmentary perspective sketch of another portion of the apparatus of FIG. 8;

Figure 1:
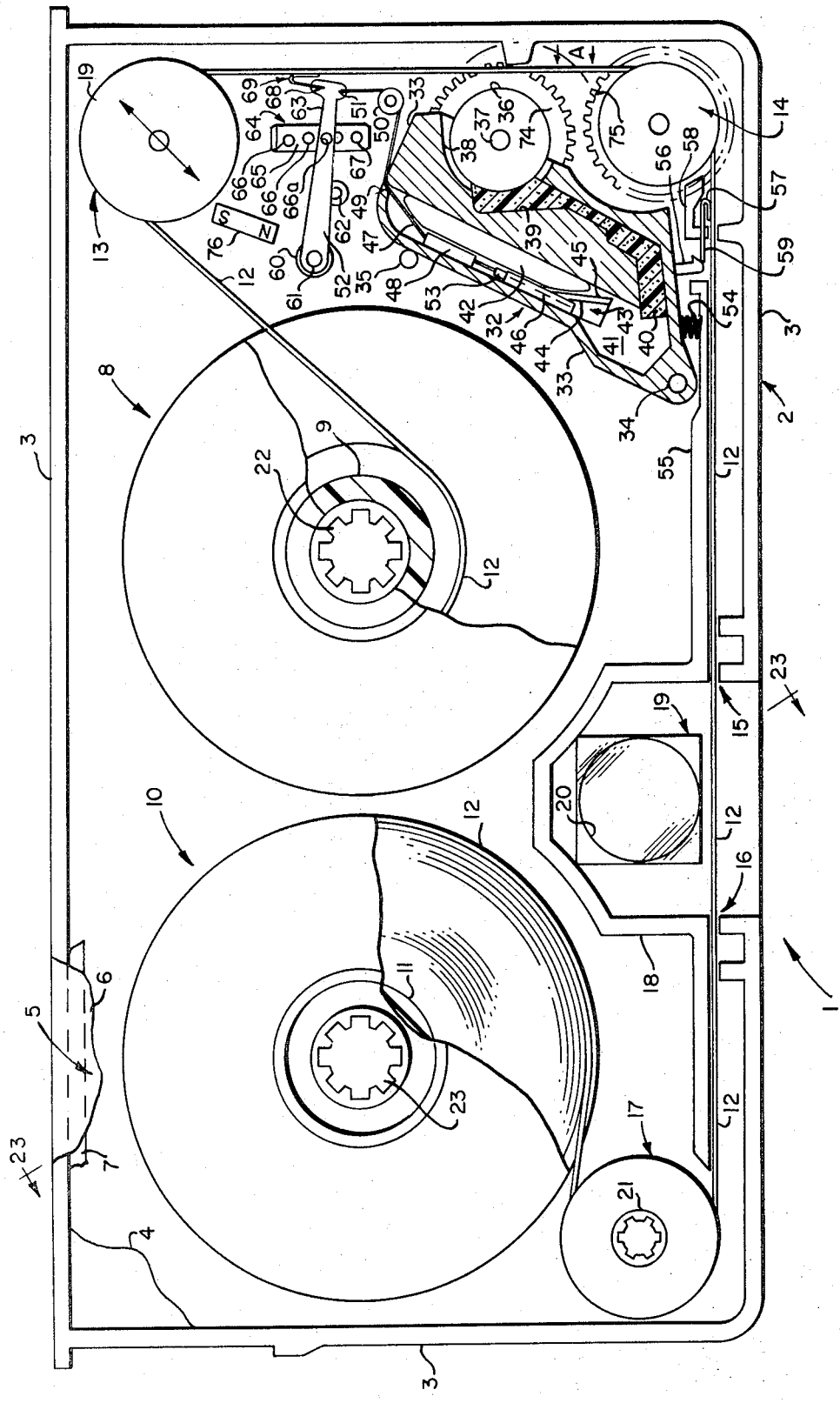
FIG. 1 is a schematic plan sketch of a film cassette in accordance with our invention, with parts shown in cross section and parts broken away.
Figure 8:
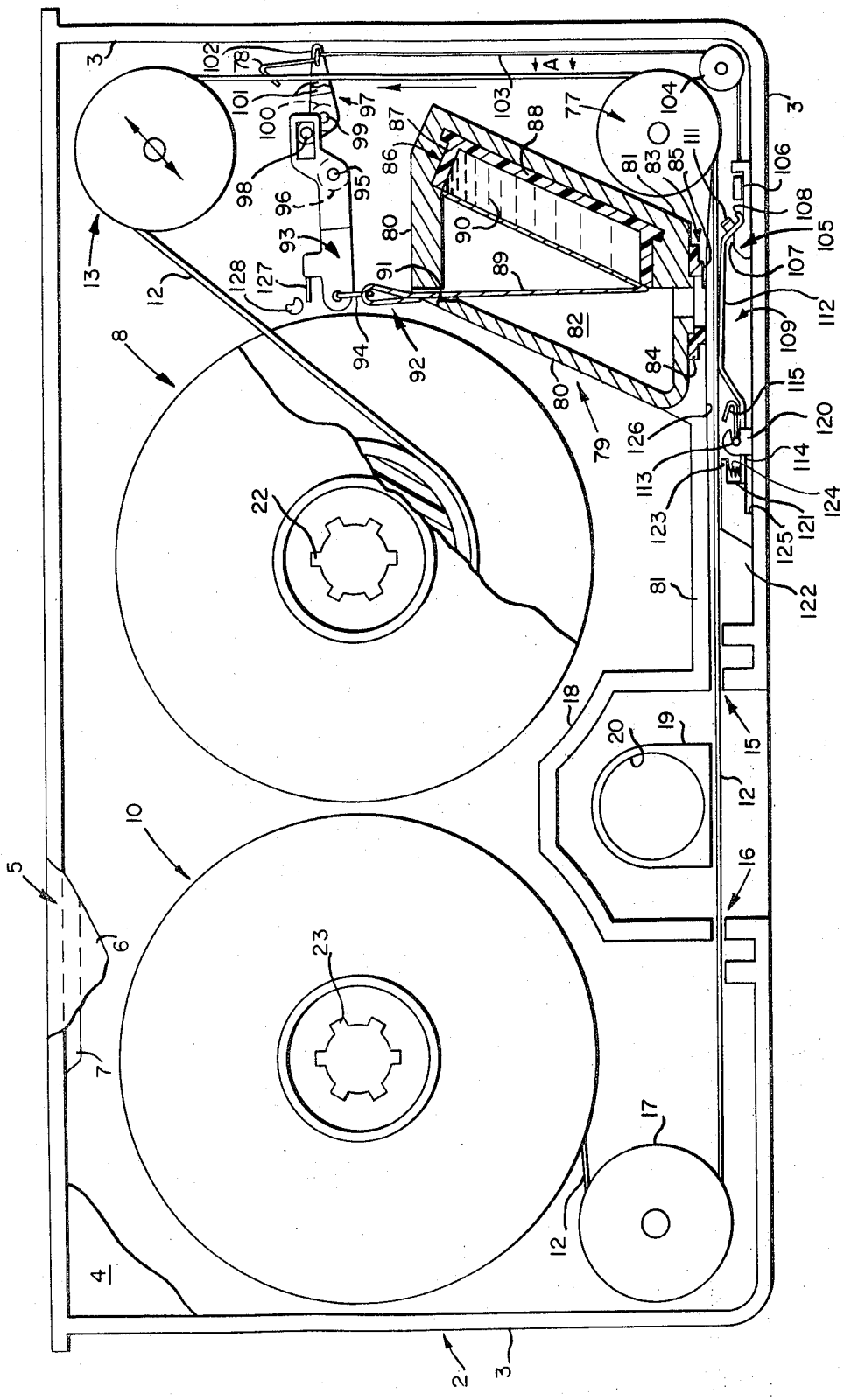
FIG. 8 is a schematic plan sketch, with parts omitted, parts shown in cross section, and parts broken away, of a modified photographic cassette in accordance with a second embodiment of our invention.
Figure 19:
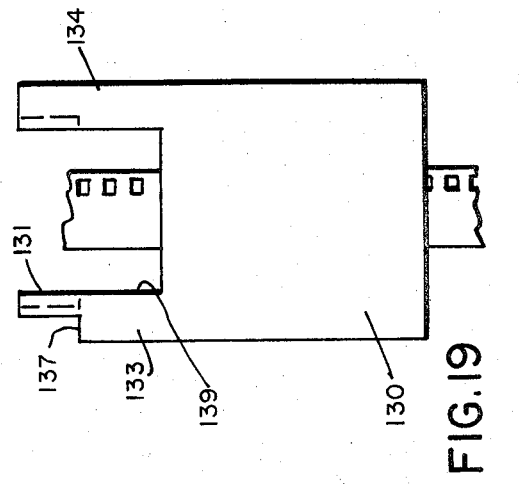
Figure 17:
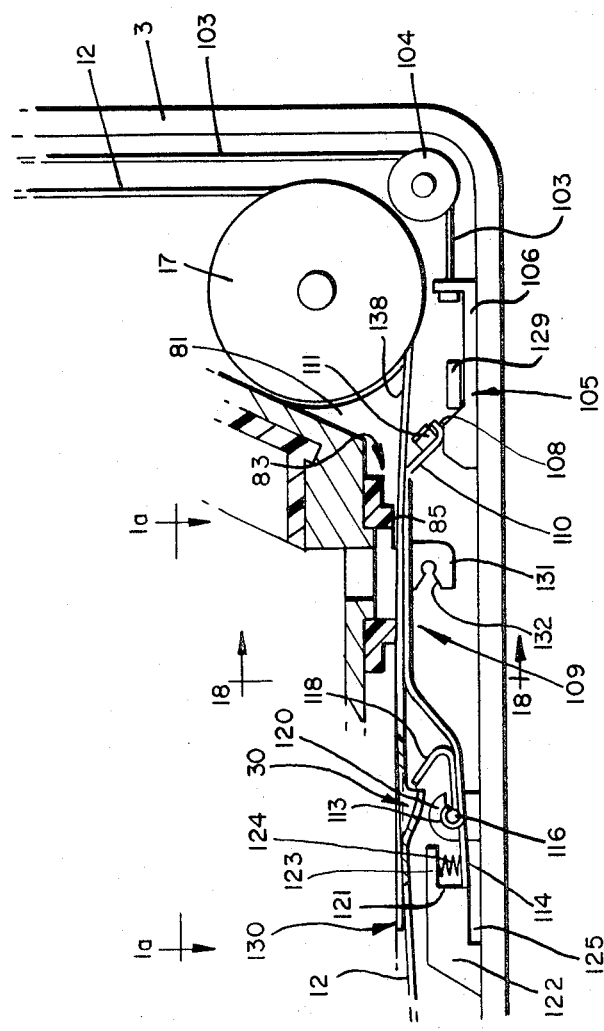
Figure 18:
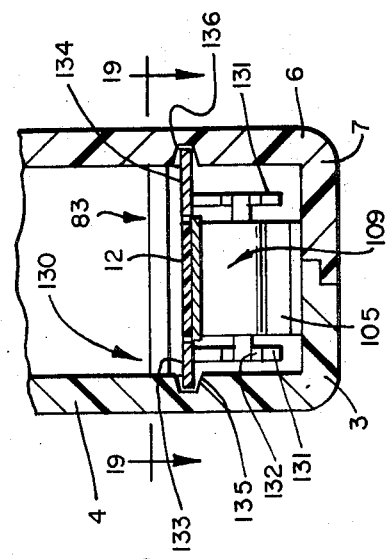
Figure 21:
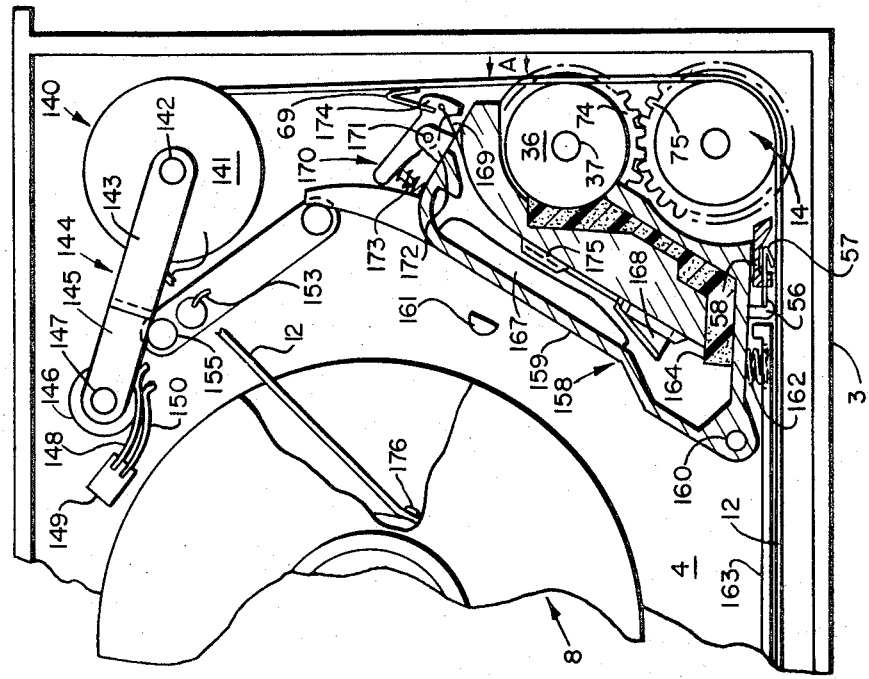
Figure 20:
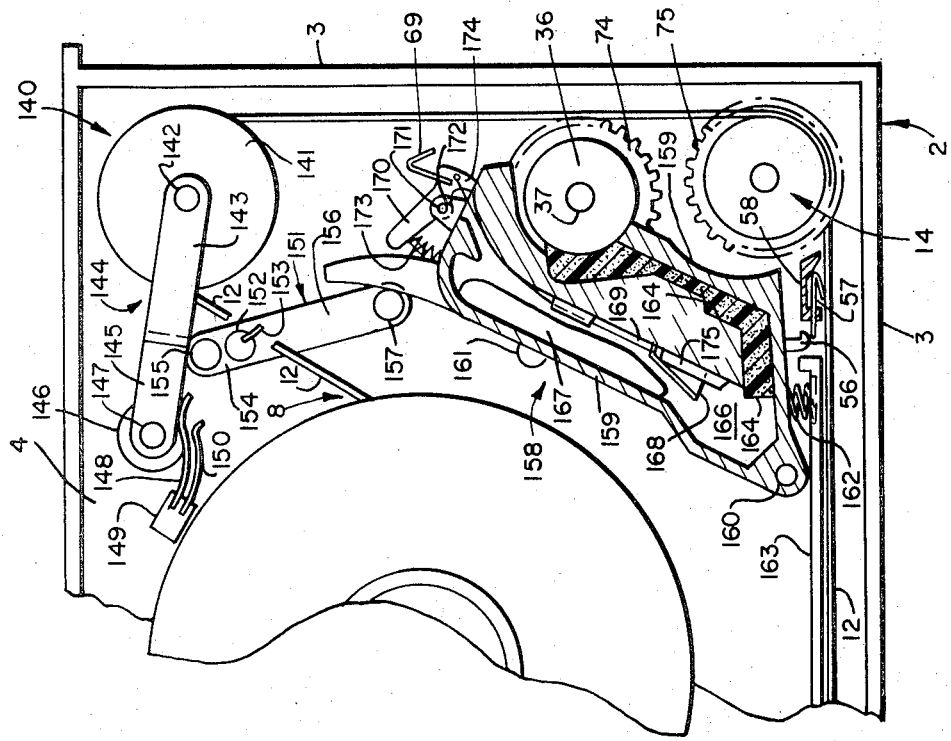
Figure 26:
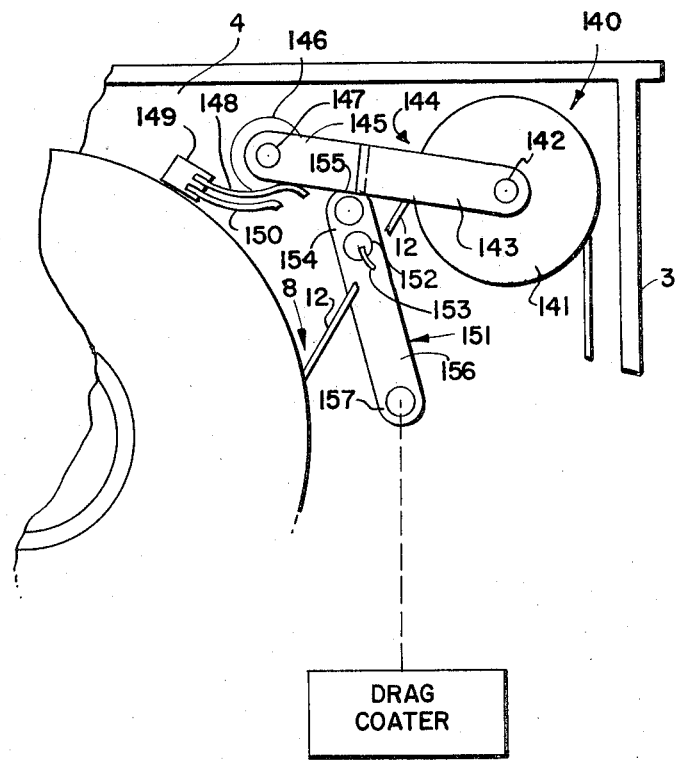

FIGS. 9–13 comprise fragmentary plan sketches, with parts omitted, parts shown in cross section, and parts broken away, illustrating the operation of the apparatus of FIG. 8 as it proceeds through a film processing cycle in accordance with our invention;

FIG. 14 is a schematic perspective sketch of a pressure pad forming a part of the processing apparatus of FIGS. 8–13;

FIG. 15 is a fragmentary schematic perspective sketch of a detachable hook forming a part of the apparatus of FIGS. 8–13, shown in combination with the support with which it is initially engaged;

FIG. 16 is a fragmentary schematic plan sketch of portions of the apparatus of FIGS. 14 and 15, taken substantially along the lines 16—16 in FIG. 14;

FIG. 17 is a fragmentary schematic plan sketch, on an enlarged scale, illustrating a modification of the apparatus of FIGS. 8–16, incorporating a shutoff nozzle for the coating apparatus;

FIG. 18 is a schematic end view, with parts omitted, parts shown in cross section, and parts broken away, taken substantially along the lines 18—18 in FIG. 17;

FIG. 19 is a fragmentary schematic plan view of a portion of the apparatus of FIG. 17, taken substantially along the lines 19—19 in FIG. 17;

FIG. 20 comprises a fragmentary schematic plan sketch, with parts omitted, parts shown in cross section, and parts broken away, of still another embodiment of the cassette of our invention;

FIG. 20a is a fragmentary perspective sketch of a portion of the apparatus of FIG. 20;

FIGS. 21 and 22 comprise fragmentary schematic plan sketches, with parts omitted, parts broken away, and parts shown in cross section, illustrating the operation of the apparatus of FIG. 20 during a film processing cycle;

FIG. 23 comprises a schematic cross sectional view, with parts broken away, of a portion of the cassette of FIG. 1, taken essentially along the lines 23—23 in FIG. 1, and shown in association with a schematically illustrated film drive and projection system adapted to cooperate with the cassette of FIG. 1;

FIG. 24 is a schematic perspective sketch illustrating the relationship between the cassette (corresponding to any of the embodiments shown in FIGS. 1–22) in its operative association with a film drive and projection system and a viewing screen;

FIG. 25 is a schematic block and wiring diagram illustrating the manner in which the film drive and projection apparatus of FIGS. 23 and 24 may be operated to manipulate the cassette of any of FIGS. 1–22 to cause the processing and projection operations to be described to be carried out in accordance with our invention and FIG. 26 is a fragmentary plan sketch, with parts omitted, parts broken away and parts shown in block diagram form, illustrating another modification of the cassette of our invention.

Referring now to FIG. 1, we have shown a film cassette generally designated 1 and comprising a base member generally designated 2 of any suitable material such as metal, opaque plastic, or the like. The base member 2 is provided with side walls 3 substantially circumscribing the cassette, except for a film gate, to be described. The side walls 3 are formed integral with a base plate 4, fragmentarily shown in FIG. 1, that completes one side of the housing. The housing is completed by a cover, generally designated 5 and fragmentarily shown in FIG. 1, of metal, opaque plastic, or the like. The cover 5 is provided with a top portion 6, forming a side of the cassette opposite the base plate 4, and formed integral with side walls 7 that are interfitted with the side walls 3 of the base 2 in any conventional manner, not shown in detail, such that when assembled together, the base 2 and cover 5 form a light-tight housing that is pierced in a manner to be described by light-baffled apertures forming a film gate.

If made of metal, the base and cover parts 2 and 5 may be interlocked by cooperating detents formed in the parts in a conventional manner. If of plastic, the parts may simply be adapted to fit relatively closely together, and there sealed into integral relationship during final assembly of the appparatus.

The factor governing the location of the parting lines between the base and cover is simply manufacturing convenience. Specifically, it is convenient to take one portion, here shown as the base 2, as a platform upon which all of the additional fixed and moving parts to be described can be assembled in their initial operating relationship before the cover 5 is mounted on the base and there secured.

Within the housing comprising the base and cover parts, and rotatably mounted on the base plate 4 in a manner to be described in somewhat more detail in connection with FIG. 23 below, are a supply reel generally designated 8 having a spool portion schematically shown at 9, and a takeup reel generally designated 10, having a spool portion schematically illustrated at 11. A strip of film 12, whose construction will be described in more detail below, has one end connected to the supply reel 8 and an opposite end connected to the takeup reel 10. The film 12 is initially in its unexposed state, and is coiled primarily about the supply reel 8. In FIG. 1, however, it is shown coiled primarily about the takeup reel 10, as it would generally appear after exposure of the film in a camera.

The film 12 extends from the supply reel 8 over a path along which it first encounters a conventional bobulator roll 13. The film engages a portion of the periphery of the bobulator roll, as shown, and passes therefrom around a conventional idler roll 14 journalled for rotation in the housing, and thence through a conventional light-baffled aperture schematically indicated at 15 and forming a portion of a film gate in the housing.

The film 12 re-enters the housing through a second light-baffled aperture generally designated 16 and comprising a second portion of the film gate. The film 12 next passes over a conventional snubber roll generally designated 17, and thence to the takeup reel 10.

The bobulator 13 may be of any conventional construction, and performs the known function of isolating the film drive pawl associated with the camera or viewing apparatus, to be described, from the inertia of the supply reel 8. For this purpose, the bobulator roll 19 is mounted in any conventional manner on a pivot that is in turn mounted on a support movable with respect to the frame and biased by a spring, such that the bobulator roll can be moved backwards and forwards in the directions of the double arrow shown in FIG. 1. The bobulator roll thus responds to increases or decreases in the tension of the film 12 by temporarily shortening or lengthening the film path, respectively. Such changes in film tension are produced by the actuation of the film drive pawl, and determined by the inertia forces exerted by the supply reel 8, together with the larger or smaller supply of film that may be on it at any given time. By that arrangement, as the film is advanced incrementally by the pawl associated with the camera or projector, it can rapidly move the bobulator roll against its relatively light spring without immediately affecting the supply reel, which can then more or less gradually allow the bobulator roll to relax while supplying the segment of film taken by the pawl.

A light-tight sheild around the film gate formed by the apertures 15 and 16 is formed by a wall portion 18 formed integrally with the base plate 4 of the base 2 and later formed integral with the cover 5 in the manner described above. An exposed chamber behind the film is thus formed for the purpose of admitting projection light.

The apparatus for this purpose is conventional, and will only briefly be described. In short, it comprises a prism generally designated 19 and comprising a mirror, not shown in FIG. 1 but to be described in more detail in connection with FIG. 23, to direct light, entering the cassette through an effective aperture schematically indicated at 20 and normal to the plane of FIG. 1, downwardly through the film 12 in the film gate in FIG. 1 for projection through a suitable lens assembly, to be described.

Also disposed in the chamber bounded by the wall member 18 and the film passing through the film gate is a conventional pressure plate, not shown, located between the prism and the film, and spring biased into engagement with the film. The pressure plate serves in the conventional manner to cooperate with a camera, by locating the focal plane of the film during exposure. A conventional framing aperture is also provided in the pressure plate, now shown, to pass light entering through the prism assembly 19 through a selected frame of the film 12, after the film is processed in a manner to be described.

The snubber roll 17 may also be of entirely conventional construction. As illustrated, it is provided with a hub portion schematically indicated at 21 that is adapted to protrude through a suitable light-baffled aperture in the cover panel 6 for engagement by a stop member, comprising a part of either the camera or the projection system that is engaged when the film is to be incrementally advanced by a pawl for exposure or projection purposes. The cooperation between the snubber roll 17 and the takeup reel 10 is conventional, but will be briefly described.

The takeup reel 8 and the supply reel 10 are provided with drive sprockets 22 and 23, respectively, which in the embodiment here shown and described are adapted to protrude from the cover panel 6, through suitable light-baffled apertures, for engagement with corresponding drive sprockets comprising a part of a camera, or of the projection apparatus. In the projection apparatus, both supply and takeup reels are adapted to be driven through slip clutches. In the camera, only a drive for the takeup reel need be provided. This drive comprises a slip clutch connected to a sprocket driving the takeup reel drive sprocket 23, in cooperation with a film drive pawl sequentially engaging a series of sprockets formed on the film 12, in an array to be described, along a portion of the edge of the film in the film gate between the apertures 15 and 16.

When the snubber reel 17 is stopped by engagement of the hub 21 as described above, operation of either the camera or the projector to incrementally advance the film towards the takeup reel, by engagement of a pawl with the sprockets in the film 12, will momentarily loosen the film from engagement with the stationary snubber roll 17 and allow the slip clutch driving the takeup reel 10 to take up that increment of the film advanced by the pawl. Between engagements of the pawl, the slip clutch prevents the takeup reel from advancing the film.

In the film drive and projection apparatus to be described, the snubber reel 17 is engaged only while the film is to be incrementally advanced onto the takeup reel. When the film is rewound onto the supply reel, or advanced continuously onto the takeup reel, the snubber reel 17 is disengaged and acts as an idler. As will appear, that may occur prior to processing, during processing of the film while rewinding, or during subsequent rewinding of the processed film after projection.

In its path between the bobulator roll 13 and the film gate aperture 15, the film 12 passes over a path segment adjacent which is processing station, to be described, is located. Before describing the processing station, the construction of the film, the photosensitive coating thereon, and suitable processing composition therefor, will be discussed in connection with FIG. 2.

Referring to FIG. 2, the film 12 is shown to comprise a leader terminating in an end formed with an aperture such as 24. The aperture 24 serves to connect that end of the film to the takeup reel 10. Behind the leader, which may be in the neighborhood of 18 inches in length, there is a strip of photographically useful film, upon which projectable images may be formed, and which may be, for example, approximately 52 feet in length for 8 mm film. Following the photographically useful portion of the film is a trailer region, terminating at another end in an aperture 25 by means of which that end of the film is adapted to be connected to the supply reel 8.

The film 12 may comprise a base of any suitable transparent material of the kind conventionally used for film bases. On this base is applied, at least over the central portion of the photographically useable length of the film, an emulsion comprising a photosensitive coating, whereon a series of latent images illustrated by an initial frame 1 and a terminating end frame in FIG. 2 may be formed with a camera.

Photosensitive coatings useable in the practice of our invention may be of any conventional variety adapted to be developed by a monobath processing composition to form a positive transparency suitable for projection. In particular, a currently preferred embodiment of our invention makes use of a film structure which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

In typical silver transfer reversal processes for the projection of black and white images, a silver halide developer and a silver halide solvent are applied in an aqueous alkaline solution to a photoexposed silver halide stratum or emulsion, where they develop exposed silver halide to silver, and react with unreduced silver halide to form a soluble silver complex. This complex, in order to form a positive print, is transferred and reduced to silver on a silver-receptive stratum upon which the silver halide stratum has been superposed. In one practice, in the completion of this process, the silver-receptive and silver halide strata have been separated in order to render the positive print visible.

However, as indicated above, the positive print may be rendered visible without separation of the silver halide and silver-receptive strata. For example, the silver-receptive stratum may be so constituted as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive prints in superposition provide a composite print that presents a good image for projection purposes so long as they are contained on a transparent support. Since the silver halide stratum and the silver receptive stratum need not be separated, an overall simplification of the silver transfer-reversal process is achieved.

A composite film assembly of this type, as well as processing compositions for producing a fully developed black and white image without the necessity of removing the developed negative image after processing, are shown in prior U.S. Pat. No. 2,861,885 to Edwin H. Land, which issued on Nov. 25, 1958 for Photographic Processes and Products. Other composite film assemblies capable of producing developed full color images without the necessity of removing the developed emulsion are shown in prior U.S. Pats. of Edwin H. Land, Nos. 2,726,154, issued Dec. 6, 1955, for Photographic Products, and 2,944,894, issued July 12, 1960, for Photographic Processes Utilizing Screen Members.

It should be noted that our invention is not directed to the chemistry by which images are developed in a photosensitive emulsion and transferred to an image receiving strata. However, in the practice of our invention, whether the film employed is black and white or color film, at the present time the preferred embodiment of our invention employs film of a type not requiring the removal of a negative emulsion after it is developed.

Referring again to FIG. 2, the film 12 is formed along one edge with sprocket holes such as 26 at regular intervals adapted to cooperate with a drive pawl in either camera or projector for incremental advancement of the film in the manner discussed above. As shown, the series of sprocket holes adjacent the trailing end of the film may be interrupted by an elongated sprocket hole 27. Such a hole, which may span, for example, two of the normally spaced sprocket holes 26, will pass the camera pawl without film advance, and thus terminate advance of the film in the camera at a predetermined exposure end point so selected that the film will not be carried substantially beyond the usable emulsion portion.

If desired, a similar pawl in the film drive and projection apparatus to be described may also be used to terminate forward movement in the projector. Alternatively, the film drive and projector unit may be provided with a double pawl to pass this first elongated aperture 27, and advance movement in that apparatus may be terminated by a further elongated sprocket hole, not shown. As another alternative, to be described, a single pawl in the projector may be employed, but the snubber roll can be disconnected prior to processing to allow the film to be carried forward onto the takeup reel until advance motion is terminated by slipping of the drive clutch as the end of the trailer on the supply reel is reached. For certain purposes of our invention, as will appear, the latter mode of film advance termination is preferred.

At a location adjacent the trailing end of the film 12, in the region generally designated by the arrows A, there is formed a central aperture 28, adapted to engage the processing apparatus in a manner to be described to commence the processing operation. Adjacent the aperture 28 is formed an edge notch 29 which functions in a manner to be described below. Similarly, adjacent the leading end of the film 12 is formed, in the region generally designated by the arrows B, a central aperture 30 and an adjacent edge notch 31. These latter singularities in the film cooperate with the processing apparatus in a manner to be described to terminate film processing and disengage the processor.

Referring again to FIG. 1, the processing apparatus of our invention is shown as comprising a reverse roll coater generally designated 32. The coater 32 comprises an outer housing 33 journaled to the base plate 4 for rotation in the housing by means shown here as a pivot post 34 formed integral with the wall 4. The housing 33 is thus adapted to rotate in the cassette housing between an inactive position, shown in FIG. 1, in which it engages a stop 35 formed integral with the base plate 4, and in which position the processor is inactive, and a film engaging position, to be described. In the film engaging position, a coating roll 36 engages the film 12, and is also drivingly engaged with the idler 14, in a manner to appear, so as to rotate in a direction opposite to the rotation of the idler 14 and against movement of the film 12 as it is advanced from the takeup reel towards the supply reel during processing.

The coating roll 36 is journalled in the housing 33 by means here schematically shown as a shaft 37. A recess 38 is formed in the housing to receive the roll 36, and communicates with a passage 39 in the housing 33. In the passage 39 is a wick 40, of any suitable capillary material, adapted to absorb processing composition supplied to it in a manner to be described and apply the composition to the roll 36 during processing.

The lower end of the wick 40, as seen in FIG. 1, communicates with an enlarged chamber 41 formed in the housing 33 below an initially sealed pod 42, containing processing composition of the kind described above. The pod 42 may be made of any suitable material, such as lead foil or the like, coated at least internally with a suitable material, such as a conventional synthetic thermoplastic resin or the like, chosen to be resistant to the processing composition. The pod may be retained in the position shown by friction, suitable retaining ledges, or by any conventional adhesive or the like.

The pod 42 is adapted to be opened in a manner to be described to release processing composition to the wick 40, and thereby supply the roll 36. For this purpose, a knife blade generally designated 43 is slidably mounted adjacent the lower end of the pod 42 and provided with a cutting edge 44 tapering to a sharp corner 45. The blade 43 is slidably mounted in the housing 33, and guided by guides schematically indicated at 46 connected to or formed integral with the housing 33.

One end of the knife blade 43 is connected, in a manner sufficiently suggested but not shown in FIG. 1, to a cable 47, of steel wire or cable, a synthetic resin monofilament, or the like. The cable 47 extends through a suitable aperture in a guide and stop member 48 formed integral with the housing 33, and thence through a suitable aperture 49 formed in the housing 33, about an idler 50 journalled to or formed integral with the base plate 44, to an end 51 connected to a lever 52, to be described.

A stop 53 is secured to the cable 47, and is adapted to engage the stop and guide member 48 to limit the movement of the cable 47, for purposes to appear in detail below. Generally, however, it will be apparent that as the cable 47 is drawn upwardly and to the right in FIG. 1, the blade 43 will engage the pod 42, cutting it open and releasing the processing composition. Other functions accomplished by movement of the cable 47 will be apparent as the description proceeds.

As shown in FIG. 1, the processor housing 33 is urged upwardly against a stop 35 formed integrally with the base plate 4 by means comprising a compressed spring 54. The spring 54 extends between the base of the housing 33 and a wall portion 55, formed integrally with the wall portion 18 and the base plate 4, and ultimately secured to the cover plate 6.

A latch member 56 is formed integral with or otherwise secured to the housing 33, and is at times adapted to cooperate with a detachable hook 57 frictionally engaged in a slot formed in a wall member 58 formed integral with the floor plate 4. The latch elements comprising the member 56 and the shank 59 of the hook 57 are shown disengaged in the initial position of the apparatus illustrated in FIG. 1, and in their engaged position in FIG. 6, to be described.

A lever 52 is pivoted to a suitable post 60 formed integral with the floor plate 4 by conventional means here shown as a pivot pin 61. The lever 52 is initially engaged with a stop post 62 formed integral with the floor plate 4, as by a very light force exerted on the cable 47 by friction through its guides, and by slight frictional engagement of the blade 43 with its guides 46. Since the lever 52 and its attachments may be of very light construction, no great force is required to keep the lever in this initial position.

The lever 52 is formed with an end 63 that is adapted to engage a detent generally designated 64. The detent 64 comprises a spring 65 formed with locating projections 66 adapted to engage a cooperating recess 66a in the lever 52. The spring 65 is mounted on the base plate 4 by suitable fastening means schematically shown at 67. The lever 52 engages the detent assembly 64, in the manner illustrated in FIG. 5, at times to be described.

The lever 52 is formed at its end 63 with a slot 68 adapted to frictionally receive a detachable hook generally designated 69. As will appear, the hook 69 is adapted to engage an aperture in the film 12. Thereafter, in response to movement of the film toward the supply reel, the hook moves the lever 52 about its pivot to accomplish the functions of opening the pod 42 and erecting the processor 32, whereupon sufficient force applied by the film to the hook will cause it to be detached from the lever 52 and carried away with the film.

Referring to FIGS. 1 and 2, the hooks 57 and 69 are each adapted for unidirectional engagement with a different one of the film apertures 30 and 28, respectively. The hook 69 is adapted to ride over an aperture in the film such as 28 when the film is moved towards the takeup reel from the supply reel, but to engage such an aperture if it passes the hook 69 as the film is moved towards the supply reel. Similarly, the hook 57 is adapted to engage an aperture such as 30 when the film is moved towards the supply reel, and to ride over such an aperture as the film moves towards the takeup reel.

It will be apparent that as the coating roll 36 engages the film on the side shown, both the hooks 69 and 57 are adapted to pass over the emulsion side of the film while they are in position and before they are engaged and detached. It is desirable for these hooks to exert their forces in response to forces applied from the center of the film strip, but quite undesirable that the hooks pass over the emulsion even though they do not engage it with any appreciable force. Thus, it is preferred to form the hooks in the manner shown in FIGS. 3 and 4. For clarity, FIGS. 3 and 4 will be described in their application to the hook 69, but it should be apparent to those skilled in the art that the hook 57 may be of identical construction and cooperate with the film in the same manner.

Referring now to FIGS. 3 and 4, the hook generally designated 69 is adapted to cooperate with the central recess 28 in the film 12, and with the corresponding associated side notch 29. In order to avoid engagement of the hook 69 with the useful emulsion portion of the film, a side rider 70 is formed on the hook that is adapted to engage the edge of the film opposite the sprocket holes 26 and cause the effective hook portion 71 of the hook 69 to be held up away from the emulsion until the side notch 29 is reached, at which point the portion 70 drops into the side notch and allows the hook portion 71 to enter and engage the end of the notch 28. The shank portion 72 of the hook 69 is adapted to be frictionally engaged by the slot in the end portion 68 of the lever 52, as described above.

Having thus described the construction of this embodiment of our invention, its operation will next be described in connection with FIGS. 1-7.

As noted above, the cassette is initially manufactured and supplied to the user with the film unexposed and disposed primarily on the supply reel 8. The film is exposed by the user by placing the cassette in a suitable camera, which advances it incrementally onto the takeup spool reel 10, while exposing successive frames of the usable portion of the film between the intervals of film advancement.

When the film is exposed in the camera, it is primarily stored on the takeup reel, as shown in FIG. 1. Either during this advancement of the film in the camera, or following a subsequent advance towards the takeup reel that may be carried out by appropriate actuation of the film drive and projection apparatus to be briefly described below, the location A of the film aperture 28 and its corresponding side notch 29 is advanced to the position shown in FIG. 1, beyond the hook 69 in the direction of the takeup reel. That operation readies the film for processing upon first rewinding onto the supply reel, in a manner next to be described.

Figure 5:
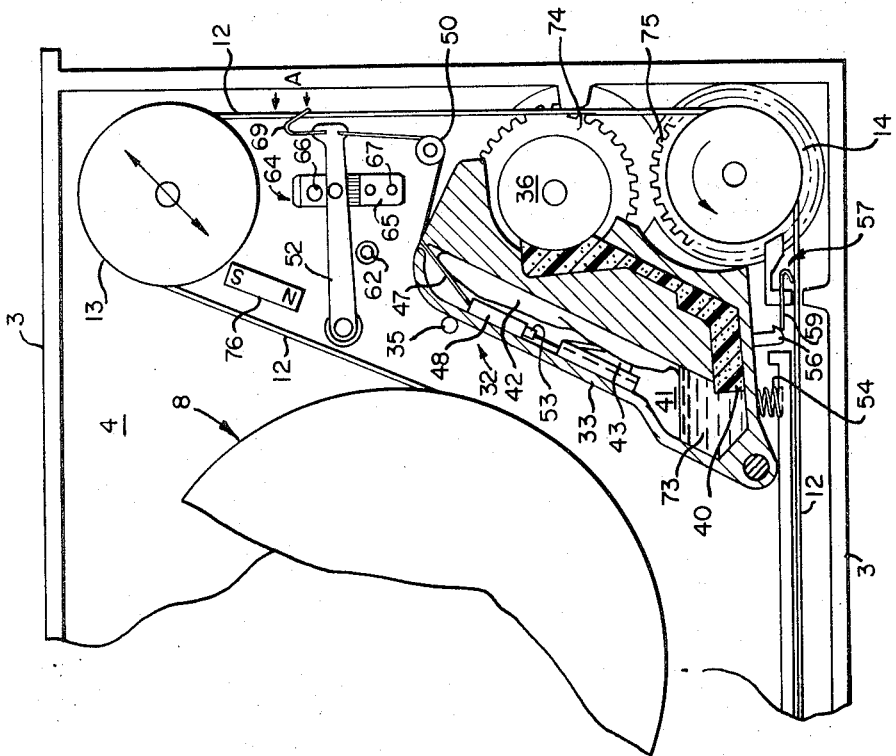
FIG. 5 is a fragmentary schematic plan sketch, with parts omitted, parts shown in cross section, and parts broken away, of a portion of the apparatus of FIG. 1, showing the parts in a second position assumed during the sequence of operation of the processing system of FIG. 1.

Comparing FIGS. 1 and 5, as the location A of the aperture 28 approaches and reaches the hook 69, the hook 69 will drop into the aperture 28 and engage its trailing edge. That will cause the hook 69 and the lever 52 to be moved with the film 12 to the first position shown in FIG. 5, in which the detent assembly 64 is engaged by the lever 52.

In the movement of the lever 52 from the position shown in FIG. 1 to the position shown in FIG. 5, the cable 47 is drawn up to bring the blade 43 into cutting engagement with the pod 42, cutting open the pod and releasing processing composition, generally designated 73. The composition 73 then flows down into the reservoir chamber 41, to be absorbed by the wick 40, and thus applied to the coating roll 36.

Figure 6:
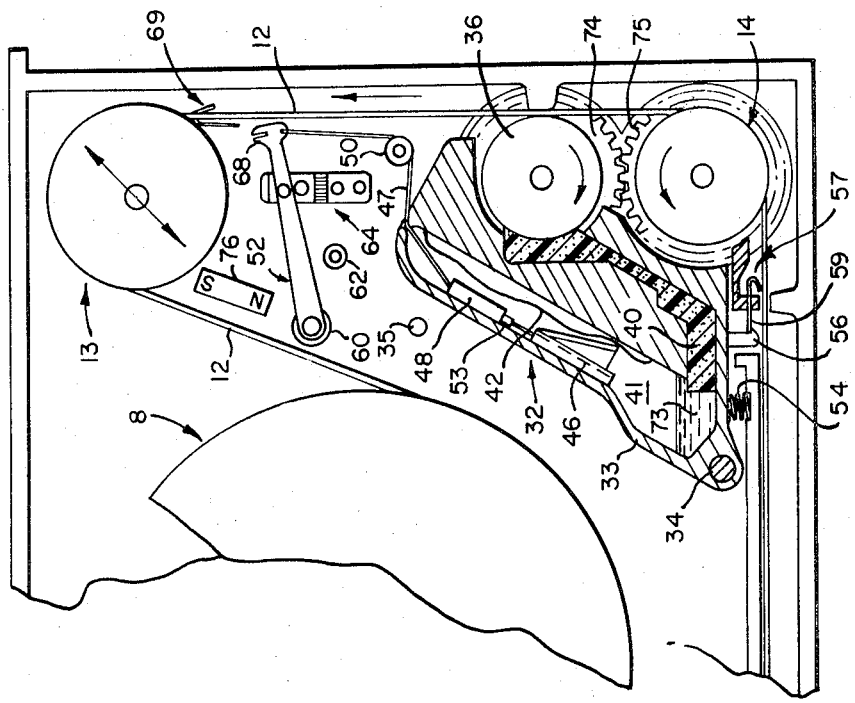
FIGS. 6 and 7 are fragmentary schematic plan sketches, with parts omitted, parts shown in cross section, and parts broken away, of the apparatus of FIG. 1, showing the parts in still other positions assumed during the sequence of operation of the processing system of our invention.

As the process of loading the wick 40 and applying processing composition to the roll 36 is begun in the manner just described, the hook 69 continues to move the lever 52, beyond the detented position shown in FIG. 5, to a position shown in FIG. 6. In this position, the force on the hook 69 becomes sufficient to detach the hook from the lever 52.

Prior to detachment of the hook 69, the lever 52 carries the cable 47 generally upwards in FIG. 6. As shown in FIG. 5, at approximately the detented position established by the detent assembly 64, the stop 53 on the cable 47 engages the stop and guide assembly 48. Thereafter, movement of the cable 47 causes a movement of the processor toward the idler 50 that ultimately results in engagement of the coating roll 36 with the film 12. At the same time, sprockets 74 attached to or formed integral with the coating roll 36 engage corresponding sprockets 75 formed integral with or attached to the idler 14, and begin to drive the coating roll 36 oppositely to the direction of motion of the film 12. When the processor is thus engaged with the film and with the drive sprockets on the idler, the latch member 56 engages the shank 59 of the hook 57 to hold the processor in its film engaging position.

Processing of the film 12 will continue with the apparatus in the position shown in FIG. 6 as the film is advanced onto the takeup reel, with the processing composition 73 being gradually exhausted as suggested in FIG. 6. Preferably, the amount of the composition 73 is selected so that the composition will be substantially exhausted as the end of the photographically usably portion of the film is reached and passed.

Figure 7:
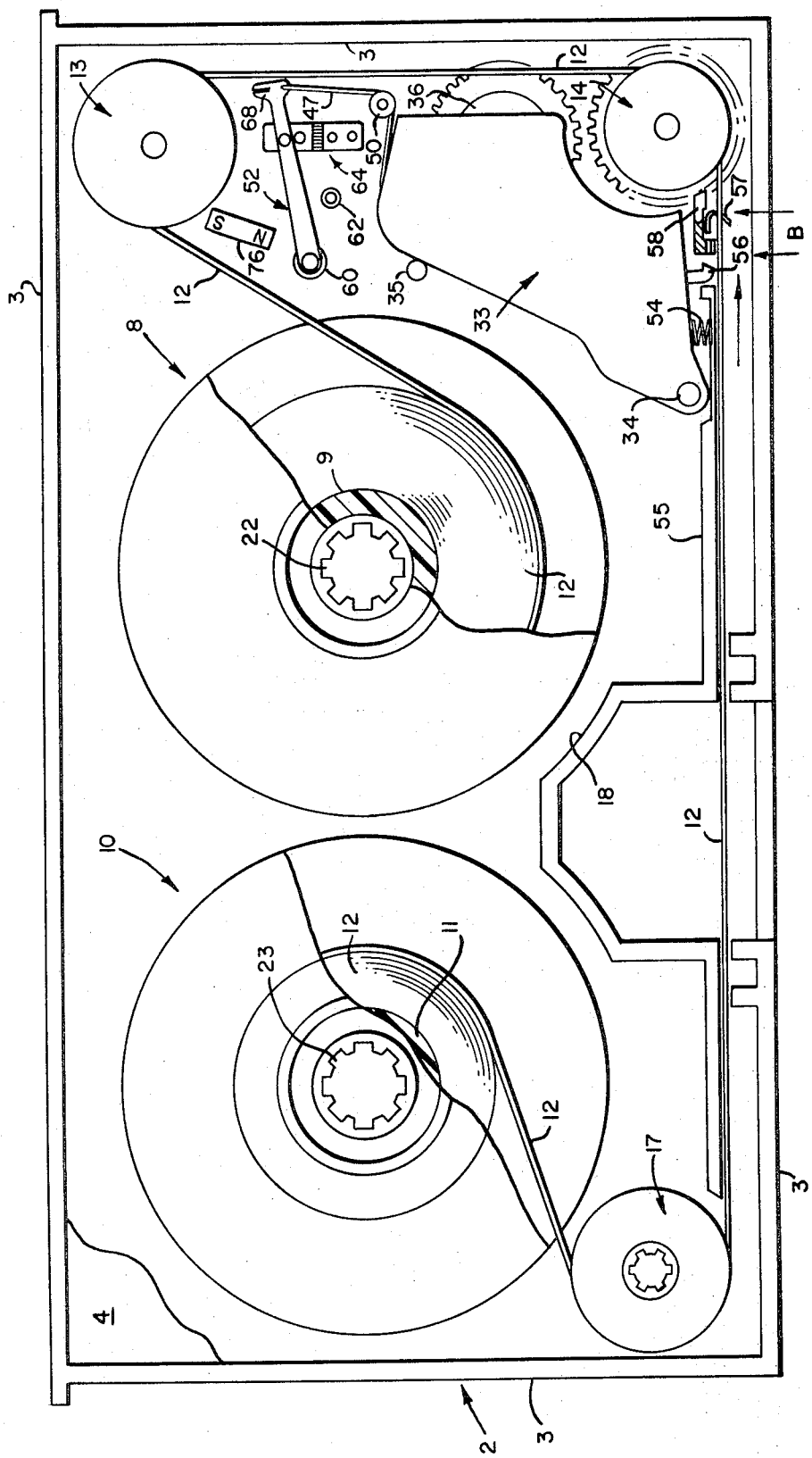

Referring now to FIG. 7, as the film nears the end of its travel from the takeup reel 10 to the supply reel 8, the location B of the film aperture 30 and its associated side notch 31 approaches and reaches the location of the hook 57. The bight of the hook 57 will then enter the central aperture 30 and be moved with the film 12 toward the supply reel 8.

When the force of the film 12 reaches a sufficient level to overcome the frictional forces exerted by the slot in the support 58 and by the engaging latch member 56, the shank of the hook will be detached from the support 58. That will release the latch 56 and allow the processor housing 33 to be moved upwards about its pivot 34, under the influence of the spring 54, until it again engages the stop 35.

During this process, the cable 47, which has remained stopped in the position shown in FIG. 6 by the cooperation of stop elements 53 and 48, will move the lever 52 back until it is again in engagement with the detent assembly 64 when the processor stop 35 is engaged. The processor parts are now permanently held out of engagement with the film, with the lever 52 prevented from rattling about in the housing by its engagement with the detent assembly 64.

The hooks 57 and 69 may remain with the film, being made for that purpose of light metal or plastic. Alternatively, if desired, the hooks may be made of light ferromagnetic material adapted to be attracted to and thereafter retained by a magnet such as 76, suggested in FIGS. 1, 5 and 6, affixed to the housing, as by securing it to the floor plate 4.

Immediately following processing in the manner just described, it is preferred that the film be projected, and thereby intermittently advanced from the supply reel onto the takeup reel 10, and thereafter rewound onto the supply reel 8. This operation not only permits the operator to immediately review the results of his photography, but serves to further aid in completely drying the processed film.

FIGS. 8-16 show another embodiment of our invention in which a drag coater, and specifically, a doctor bar coater, is employed as the processing means. Such a coater is generally to be preferred because it is inherently relatively insensitive to changes in viscosity of the processing composition, as a function of temperature or formulation, as well as to reasonable changes in processing speed of the film as it is moved past the processing station. That is, the doctor bar will inherently lay down a coating approximately one-half the thickness of the aperture between the bar and the coated substrate over a relatively wide range of processing conditions.

This property of the doctor bar coater is well known in the art per se, but we have discovered that it is especially desirable for use in self-contained processing systems for film and the like, because otherwise onerous requirements on the processing system are thereby greatly relaxed. In particular, as we desire particularly to make it possible for the user to process his film immediately after it is exposed, it can be expected that the processing composition will be exposed to considerable variations in temperature, and may be applied to the film while its temperature is changing. Another factor is that black and white or color emulsions of different speed and processing characteristics may require different formulations of processing compositions involving varying viscosity. Finally, while one can arrange to move the film at a uniform speed relatively to the processing station by adjusting the shaft speed of the supply reel as a function of the radius of the film wound onto it, it is considerably simpler simply to drive the supply reel during rewind at a constant angular velocity, with a resulting variation in film speed during processing. Obviously, coating apparatus which is insensitive to these variations facilitates carefree operation and use by the photographer.

In FIGS. 8-16, parts which may correspond in structure and function to those described above in connection with FIGS. 1-7 are given corresponding reference characters. Modified parts, additional or different parts, or those parts performing more or fewer functions than those described above, are given new reference characters.

Basically, referring to FIG. 8, the cassette in accordance with this embodiment of our invention comprises an opaque housing of the type described above, including a base portion 2 formed with side walls 3 and a floor plate 4. As the final step in manufacture, a cover portion 5 is attached to the base 2. The cover 5 has a top panel 6 and is formed with side walls 7 cooperatively engaging the side walls 3 of the base portion 2. A takeup reel 8 and a supply reel 10 are rotatably mounted in the housing for the purposes described above, and serve to transport the strip of film 12 reversibly along a path extending over a bobulator roll 13, an idler roll 77, past the processing station, to be described, through the film gate comprising light-baffled apertures 15 and 16 formed in the housing for the purposes described above, over a snubber roll 17, and thence to the supply reel 10. The bobulator and snubber rolls, 13 and 17, respectively, may be of the same construction described above. The idler roll 77 is identical in its idling function to the idler 14 in FIG. 1, but need not carry the process roll drive sprockets 75 described above. In short, the idler 77 is simply an idler rotatably mounted in the housing which serves to rotate the direction of motion of the film 12 in the housing through ninety degrees.

The film 12 used in the apparatus of FIGS. 8–16 may be identical with that described above in connection with FIG. 2, and functions in substantially the same way to program the cycle of operation of the processing means, in a manner to appear.

As in the embodiment described above, the film 12 in FIG. 8 is shown in the position assumed following exposure by the camera when it is primarily stored on the takeup reel 10. As before, the location A of the process initiating recess 28 in the film 12 has been advanced beyond the position of a unidirectional detent comprising a detachable hook 78, to be described, which is arranged to pass the aperture as it moves towards the takeup spool, and then engage it as it moves back towards the supply reel in the direction of the arrow as suggested in FIG. 8. When engaged, the hook 78 initiates the processing cycle, in a manner that will appear following the description of the processing means itself.

Basically, the processing means is divided into a first group of elements disposed below the plane of the film and to the right of the film in FIG. 8, on the film base side, and a second group of elements disposed on the emulsion side of the film, above and to the left of the film in FIG. 8, the groups being interconnected by a yoke, to be described.

Above the plane of the film 12, and on the emulsion side as noted, there is disposed an outer process composition container generally designated 79 comprising a generally boxlike section formed by wall means 80 formed integrally with the base plate 4 and joined to the cover plate 5 during assembly to form an integral outer container. The walls 80 forming the container 79 are shown in cross section, to facilitate illustration of its interior, but may be formed integral with wall means 81. The wall means 81 serve to form a portion of the light-baffling structure of the film gate 15, and form an extension of the projection port wall 18 that serves as a film guide, as will appear.

The walls 80 enclose a chamber 82 terminating at its lower end in an outlet passage communicating with a coating nozzle generally designated 83. The nozzle 83 may be formed integral with the wall means 80, but is preferably a separate element because its coating surfaces are required to be formed to closer tolerances than is necessary, or for practical purposes, desirable, for the container 79. The nozzle 83 may be formed with a retaining flange 84 to serve to secure it in position in the housing, and at its effective trailing edge with a doctor bar 85 that serves to meter processing composition to the film.

Within the outer container 79 is disposed an initially sealed inner container comprising a receptacle generally designated 86, shown in cross section in FIG. 8 and in perspective sketch in FIG. 8a. The receptacle 86 may be of any suitable material, such as plastic or the like, selected to be resistant to the generally alkaline processing composition which it is to contain.

As illustrated, the receptacle 86 comprises a generally boxlike structure comprising side walls 87 closed on one side by a bottom panel 88 that extends from the side walls in the manner illustrated to form flanges for retaining the receptacle 86 in the walls 80 of the outer container 79. One side of the receptacle 86 is open, and formed with a plane edge surface, surrounding the opening, that is sealed by an end portion of a flexible tear tab 89.

The tear tab 89 may be of any suitable synthetic resin or the like, adapted to be heat-sealed or otherwise adhesively, but detachably, secured to the open side of the receptacle 86, to retain therein a charge of processing composition 90. The free end of the tear tab 89 extends upwardly through a recess 91 formed in the walls 80 to an actuator engaging element here shown as a loop 92 formed at the end of the tear tab 89.

The loop may be formed by folding the tear tab over itself and securing the folded end by heat-sealing, or by a suitable adhesive or the like, to form the actuator engaging loop 92. The loop 92 is operatively connected to a lever 93 by means of a link 94 formed with an end engaging the loop 92 and an opposed end pivotally connected to the lever 93.

The lever 93 is fulcrumed, by means of a pivot pin 95, to a post 96 formed integral with the floor plate 4. The other end of the lever 93 is pivotally connected with lost motion to a second lever 97 by means of a pivot pin 98.

The lever 97 is pivoted for rotation in the housing by means of a pivot pin 99 engaging a post 100. The post 100 may be formed integral with the floor plate 4.

As best shown in FIG. 8b, the lever 97 is formed at its other end with a yoke comprising a pair of arms 101 extending on either side of the film 12 and joined on the base side of the film by a cross piece 102. The cross piece 102 is formed with a slot to frictionally receive the shank portion of a hook 78.

While schematically shown in FIG. 8, the hook 78 may be of the form shown and described in connection with FIGS. 3 and 4. Alternatively, if desired for simplicity, the rider 70 may be omitted, because the hook 78 is adapted to contact the film on the base side and thus is not apt to cause visible damage to the film prior to its detachment from the lever 97 in the course of processing.

Also connected to the cross piece 102 of the lever 97 is a cable 103, of synthetic monofilament, metal wire, or the like, that extends over an idler 104 to a connection with a cam block generally designated 105. The cam block 105 is located below the plane of the film 12 in FIG. 8, and is adapted to slide against the side wall 3, and to be guided for this purpose by the base plate 4 and cover plate 5, or by suitable guide slots or other guiding surfaces, for movement from the position shown in FIG. 8 to a position to the right of that shown in FIG. 8, the latter to be described in connection with FIG. 10 below.

As shown, the cam block 105 is provided with a first lower surface 106, and tapers to a raised surface 107 for purposes to appear. In the initial position of the parts shown in FIG. 8, the lower surface 106 of the cam block 105 is engaged by one end 108 of a pressure pad generally designated 109 and best shown in FIG. 14.

Comparing FIGS. 8 and 14, the end 108 of the pressure pad is formed adjacent an inclined portion 110 engaged by a spring 111 that is connected at one end to the floor plate 4 to bias the pressure pad 109 downwardly and to the left as seen in FIG. 8. The central portion of the pressure pad 109 comprises a raised and plane portion 112 adapted to engage the base of the film 12 and urge it against the nozzle 83, as will appear. Following the film engaging portion 112, the pressure pad tapers downwardly, as best shown in FIG. 14, to a portion formed into three arms, two of which are curled to form open-ended, pin engaging hooks 113, on either side of a third central extending arm 114.

As best shown in FIGS. 14, 15 and 16, the hooks 113 engage a pin forming a portion of a pin and hook assembly generally designated 115. The pin and hook assembly 115 may be formed as a single integral element, but as suggested in FIGS. 15 and 16, preferably comprises a pivot pin portion 116 to which is frictionally and detachably secured the shank 117 of a hook generally designated 118 that is formed with a bight 119 adapted to pass over the base of the film 12 without engagement with an aperture such as 28 or 30 in the film, FIG. 2, whether or not any portion of the hook is in engagement with the base of the film 12, and to be engaged by an aperture, and in particular the aperture 30 in FIG. 2, when any of the bight portion 119 of the hook engages the film and the film is moved towards the supply reel 8. In the position of the parts shown in FIG. 8, no portion of the hook 118 is in engagement with the film.

As best shown in FIGS. 15 and 16, the pin 116 is initially carried in a pair of open-ended recesses formed in support arms 120. The support arms 120 are formed integral with the side wall 3, and are adapted to hold the pivot pin 116, and thereby pivotally support the pressure pad 109 by means of the hooks 113, except against motion of the pivot pin to the right as seen in FIG. 8.

The end 114 of the pressure pad 109 initially engages a ledge 121 formed on a support post 122 formed integral with the side wall 3. The ledge 121 initially prevents motion of the pressure pad 109 to the left in FIG. 8 under the influence of the spring 111. An upper ledge 123 is formed on the support 122. A spring 124, initially compressed, engages the ledge 123 at one end, and engages the arm 114 at its other end, to tend to urge the pressure pad 109 downwardly in FIG. 8, without initial effect because of the restraint imposed by the pin 116 and the hooks 113 formed on the pressure pad. A recess 125 is formed beneath the ledge 121 that ultimately receives the end 114 of the pressure pad 109 in a manner to be described.

As suggested in FIG. 8, the lower surface of the wall member 81 formed integral with the walls 80 of the outer container 79 is shaped to form a film receiving recess 126 converging to be tangential to the operating surface of the coating nozzle 83.

Having described the construction of the apparatus of FIGS. 8-16, its mode of operation will next be described with reference to those figures. Operation will be discussed on the assumption that the film has been exposed in the camera and is initially disposed on the takeup and supply reels in the manner illustrated in FIG. 8. It will be assumed that the film has been advanced to the position shown, with the location of the process initiation recess 28 as at A in FIG. 8, and further assumed that the film is being rewound onto the supply spool 8, so that the aperture location A is travelling toward the film engaging hook 78. As the aperture reaches the hook, it will be engaged therewith, in the manner shown in FIG. 9.

As suggested in FIG. 8, the loop 92 is initially connected to the lever 93 with some lost motion, so that the first movement of the hook 78 upon engagement as shown in FIG. 9 will take up that lost motion. That will bring the link 94 into operative engagement with the loop 92 as shown in FIG. 10.

At the same time, the cable 103 is drawn upwardly, as shown in FIG. 10, to bring the cam block 105 to the position shown with its raised portion 107 in engagement with the end portion 108 of the pressure pad 109, and thereby compressing the spring 111. The pressure pad is now erected and engages the film 112 with the coating surface of the nozzle 83.

If desired, the block 105, the upper portion of its raised area 107, or the pressure pad 109, may be made of any suitable resilient material so that the engagement of the pressure pad 109 with the film is resilient rather than positive. Alternatively, a positive sliding friction fit may be provided.

Referring next to FIG. 11, the hook 78 moves along with the film 12, until, in response to a predetermined force applied to the hook, it is detached from the cross piece 102 formed on the yoke portion of the lever 97. During this movement, the cable 103 is moved until the end 108 of the pressure pad 109 is near the left hand end of the portion 107, as shown in FIG. 11.

At the same time, the lever 97 moves counterclockwise in FIG. 11, causing the lever 93 to move clockwise and detach a portion of the tear tab 89 attached to the lower end of the receptacle 86, thereby opening the initially sealed container to release the processing composition 90 to flow into the nozzle 83. A coating of processing composition is then applied by the nozzle, through the aperture provided by the doctor bar 85, to the emulsion side of the film as it passes onto the supply reel 8.

As illustrated, in the terminal position of the lever 93 a flexible end portion 127 engages and passes a detent post 128 formed integral with the floor plate 4, and then engages a detent ledge formed on the post 128 to hold the lever 93 in its final position. The lever 93 will thus be secured by the residual adhesive forces securing the end of the undetached portion of the tear tab 89 to the receptacle 86. Upon its detachment, the hook 78 will move along with the film, and remain with it unless it is removed in the manner described above.

Referring to FIGS. 8, 10 and 11, as the cam block 105 approaches its final position shown in FIG. 11, a ramp between its lower portion 106 and its upper surface 107 engages a stop block 129 formed integral with the wall 4. The block 129 secures the cam block 105 against further movement in the housing.

In the position of the parts shown in FIG. 11, the film 12 will continue to move towards the supply reel 8 as the processing composition is uniformly coated on its emulsion side, drying in its passage over the idlers 77 and bobulator roll 13 toward the supply reel 8. To facilitate this purpose, while allowing for the drying of the processing composition on the film 12, the idler 77 and bobulator roll 13 may be formed with an intermediate recessed spool portion and end portions engaging the edges of the film without contacting the emulsion, so that the emulsion is out of contact with any interfering surface during its passage from the coating nozzle 83 to the supply reel 8. If desired, the housing may be provided with baffled inlet and exhaust ports through which heated air may be supplied to further assist in drying the film during the processing cycle. That provision may also be made in the embodiment of our invention first described above.

Referring next to FIG. 12, the parts are shown in the position illustrated in FIG. 11 with the exception that it is now assumed that the film has moved onto the supply reel so far that the location B of the process terminating aperture 26 in the film, FIG. 2, has approached and been engaged by the hook 118, FIG. 15. (With the pressure pad 109 in the position shown in FIGS. 10 and 11, the hook 118 engages the base portion of the film and continues to do so during processing.)

As noted above, it is desired to select the amount of processing composition 90 so that it is exhausted at the end of a processing cycle. This is a result that is more easily obtained with a doctor bar coater of the type described in connection with FIGS. 8–16 than with a wick type coater, as the latter necessarily terminates its effective role with a relatively loaded wick. The doctor bar coater, however, may remain effective until it is essentially dry.

Upon engagement of the hook 118 with the film 12, the hook 118 and its associated pivot pin 116 are carried away by the film 12, as shown in FIG. 13, releasing the hooks 113 formed on the pressure pad 109. That allows the spring 111 to drive the pressure pad 109 to the left in FIG. 13, while the spring 124 drives the end 114 of the pressure pad downwardly, to arrive at the position shown. In that position, the end 114 is received in the recess 125 formed in the support 122, the end 108 of the pressure pad has been driven down off the end of the cam block 105, and the pressure pad is consequently held latched down out of engagement with the film 12. Both the coating nozzle 83 and the pressure pad 109 are now out of engagement with the film, which is thus freed to travel back and forth for subsequent projection and rewinding.

The hook 118 and its associated pivot pin 116 may be carried along with the film and there remain. However, it is preferred not to carry the pin 116 with the film. FIGS. 17, 18 and 19 illustrate a modification of the apparatus of FIGS. 8–13 in which the pivot pin is detached and, prior to its detachment, the pin assists in performing the useful and desirable function of positively sealing the exit port of the nozzle 83. With the nozzle port sealed, any residual composition is confined in its escape to the doctor bar slot, wherein it will quickly dry to complete the seal and prevent the escape of any further processing composition until the latter hardens in the outer container 79 and no longer presents a problem. Moreover, as will appear, any such residual composition escaping through the doctor bar slot will be deposited upon the upper surface of a nozzle stop-plate that is located between the nozzle and the film, so that contamination of the film will be prevented.

Referring now to FIGS. 17–19, the apparatus to be described is the same as that just described in connection with FIGS. 8–13, except for the introduction of a nozzle closure plate generally designated 130. The nozzle closure plate 130 is initially in the position shown in full lines in FIG. 17. It is provided with a pair of depending arms 131, each formed with a recess 132 adapted to guidably receive and retain the pivot pin 116.

As best shown in FIGS. 18 and 19, the nozzle plate 130 is also provided with side flanges 133 and 134 that are adapted to be received in corresponding slots 135 and 136 formed in the floor plate 4 and the cover plate 6, respectively. The nozzle plate is thus slidable in the housing between the initial position shown in full lines in FIG. 17 and a terminal position, shown in dotted lines in FIG. 17. In the terminal position of the nozzle plate, a ledge 137 formed at the end of the flange 133 engages a corresponding stop surface 138 formed in the wall member 81.

As best shown in FIG. 19, the plate 130 is formed with a rectangular recess 139 to accept the film 12 in its engagement with the nozzle when the pressure pad 109 is erected and the plate 130 is in the position shown in full lines in FIG. 17. In the dotted line position of the plate 130, the exit port of the nozzle 83 is sealed by the rear portion of the plate 130 extending across its aperture.

To effect movement of the nozzle plate 130 to its terminal position sealing the nozzle, the depending posts 131 are engaged by the pivot pin 116. That occurs when the aperture 30 has been engaged by the hook 118, as suggested in FIG. 17, upon which the hook 118 and pin 116 are detached as described above, allowing the pressure pad 109 to be driven down and back out of engagement with the film, with the end 114 engaging the recess 125 and the end 108 down against the wall 3 following its disengagement from the upper portion of the cam member 105. The hook 118 and pin 116 will then be carried by the film, to the right as shown in FIG. 17, with the film out of engagement with the nozzle and pressure pad.

As the pivot pin 116 carried by the hook 118 is moved to the right, it will engage and be received by the cooperating recesses 132 formed in the depending arms 131. As the hook continues to move with the film 12, the pin will thereby carry the nozzle plate 130 to the right in FIG. 17, until the stop ledge 138 is encountered by the corresponding ledge 137 formed on the flange 133 of the plate 130. That occurs when the nozzle plate 130 is in sealing relation to the nozzle 83.

The pin 116 will stay in the recesses formed in the arms 131. Upon further movement of the film 12, the hook 118 will be disengaged from the pin 116 and thus carried with it as the film continues to move towards the supply reel.

The nozzle will be thus left in the closed position, with any residual fluid tending to escape beneath the doctor bar 85 contained on the upper surface of the plate 130. Since it is generally desirable that the processing coating applied to the emulsion side of the film 12 be thin, and preferably of the order of a few ten-thousandths of an inch in thickness, the passage beneath the doctor bar is small. Therefore, such fluid as may escape from it will necessarily dry rather rapidly, to completely seal the nozzle against further escape of residual fluid.

FIGS. 20–22 illustrate still another modification of the apparatus of our invention in which the processor is initially erected by an excursion of the bobulator roll beyond its normal travel, as a result of excess tension in the film developed at the end of the movement of the film onto the takeup reel. The apparatus is otherwise generally identical to that described in connection with FIG. 1, and parts which may be identical in structure and function to those shown in FIG. 1 are given identical reference numerals. Modified or additional parts are given new reference characters, as before.

Referring now to FIG. 20, the right-hand side of the casing comprising the base 2 with side walls 3 and floor plate 4 has been shown. As in the previous embodiments, in this portion of the housing, there is rotatably disposed a supply reel 8, on which the film 12 is shown in the position initially assumed before the film has been substantially exposed.

The film 12 passes from the reel 8 to a bobulator roll generally designated 140 and comprising a spool 141 journalled by means of a shaft schematically indicated at 142 to the arms 143 of a yoke generally designated 144. The yoke is best shown in FIG. 20a.

A central arm 145 of the yoke 144 is journalled at one end to a post 146 formed integral with the housing, as by means of a pivot pin 147. The bobulator roll 141 is thus mounted for movement about the axis of the pin 147 in senses lengthening and shortening the path of the film 12 from the supply reel 8 to the takeup reel. The bobulator roll 141 is restrained in this movement by a relatively light spring 148 engaging the arm 145 and supported at one end in a suitable support 149 formed integral with the base plate 4. This movement over the range constrained only by the light spring 148 serves to isolate the film drive from the inertia of the takeup reel 8 by limiting its accelerations in the manner described above.

A relatively heavier spring 150 also has one end mounted on the support 149. The spring 150 is normally out of engagement with the bobulator yoke 144, as the bobulator roll moves over the limited range described above under the normal variation in tension experienced by the film 12 as it is incrementally taken up by the supply reel 8 during exposure or projection. As will appear, when the end of the run of the film from the supply reel 8 to the takeup reel is reached, film motion will be terminated by a positive connection of the end of the film 12 to the spool of the reel 8 that prevents further motion, with consequent slipping of the drive slip clutches, and an excess tension in the film that causes the bobulator roll 141 to move beyond its normal excursions, compressing the spring 150 and engaging a bell crank generally designated 151.

The bell crank 151 is pivoted to the base plate 4 by any conventional means, here shown as a pin 152 that may be formed integral with the base plate. The bell crank 151 may be lightly constrained to the position shown by any conventional means, here schematically illustrated as a spring 153 received in corresponding slots formed in the pin 152 and the bell crank 151.

The bell crank 151 has an upper arm 154 connected to an upstanding arm 155 extending upwardly in the plane of FIG. 20 and adapted for engagement with the pivot arm 145 of the yoke 144. A second arm 156 of the bell crank extends downwardly to an upwardly extending engaging arm 157 that is adapted to erect a reverse roll coater generally designated 158, and next to be described.

The reverse roll coater 158 is provided with an outer housing 159, shown in cross section, that is journalled to the housing by means here shown as a pivot pin 160 formed integral with the base plate 4. The housing 159 is thus adapted to rotate in the housing between the position shown, in which it engages a stop 161 formed integral with the base plate 4, and a film-engaging position, to be described.

The outer housing 159 is resiliently urged against the stop 161 by means here shown as a spring 162 acting in compression between the outer housing 159 and a suitable support 163 formed integral with the base plate 4.

As in the embodiment described above, the coater 158 is provided with a coating roll 36 formed integral with a drive sprocket 74 adapted to be engaged at times with a corresponding sprocket 75 formed integral with the idler roll 14. In its disengaged position shown in FIG. 20, with the housing 159 engaging the stop 161, the roll 36 is out of engagement with the idler 14 and also out of engagement with the film 12.

The coating roll 36 is journalled for rotation in the housing 159 by means of a shaft 37. The roll is adapted to be supplied with processing composition through a capillary wick 164 performing the same functions as the wick 40 in FIG. 1. As above, the wick 164 extends through a passage 165 formed in the housing 159, and communicates therethrough with the roll 36 and with a chamber 166 formed in the housing 159 that is adapted at times to receive processing composition from a pod 167.

The pod 167 may be identical to the pod 42 described above in connection with FIG. 1, and is initially sealed to contain a supply of processing composition suitable in amount for coating the entire usable length of the film 12. In the embodiment of FIG. 20, the pod 167 is shown in engagement with the upper side of the chamber 166, and there held either by friction, or by a suitable achesive, to the wall of the housing 159.

The pod 167 is adapted to be opened at an appropriate point in the processing cycle by means of a knife blade 168 when an actuating cable 169 connected at one end to the blade 168 is moved generally upwardly and to the right in FIG. 20. For this purpose, the blade 168 is guided by guide means 175 formed integral with the housing 159.

The cable 169 is connected at its other end to a lever generally designated 170 that is fulcrumed as indicated at 171 to a suitable support 172, formed integral with the housing 159. As schematically indicated, the lever 170 is initially held in the position shown by suitable means shown as a spring 173. The end 174 to which the cable 169 is connected is formed with a suitable slot to frictionally receive a detachable hook 69, which may be identical in structure to the hook 69 described above in connection with FIG. 1.

In the initial position of the coater 158, the hook 69 is out of engagement with the film 12, but is adapted to be brought lightly into engagement with the film 12 when the processor is erected by actuation of the bell crank 151. When the processor 158 is erected, it is in a film engaging position, with the roll 36 operatively connected to the surface of the emulsion side of the film 12 and drivingly engaged with the sprocket 75 on the idler 14. It is held in that position by a detent assembly comprising the previously described construction including a latch member 56 formed integral with the housing 159, and the shank of a hook 57 which is initially frictionally engaged in a suitable slot formed in a wall member 58 formed integral with the base plate 4.

Having described the construction of this embodiment of out invention, we will next describe its operation with reference to FIGS. 20, 21 and 22. From the initial position, shown in FIG. 20, the film 12 may be assumed to move towards the takeup reel from the supply reel 8, as toward the position in which motion by the camera is terminated. FIG. 21 shows the film moved to the end of its path, at which point its connection 176 to the reel 8 prevents further movement.

The film may be carried to the position shown in FIG. 21 by various expedients; for example, by allowing the takeup reel to be driven while the snubber roll (FIG. 1) is released, defeating the purpose of the projector drive pawl and allowing the film to be advanced onto the takeup roll until motion is stopped as described. At this point, tension in the film 12 will be increased beyond the tension normally accompanying an increment of forward drive in either projector or camera, causing the spring 150 to be compressed and allowing the yoke 144 to be driven downwardly into engagement with the actuating end 155 of the bell crank 151.

That will cause engagement of the end 157 of the bell crank 151 with the housing 159, driving it away from its support 161, and causing the latch member 56 connected to the housing to be engaged with the shank of the hook 57 to lock the processing apparatus into its coating position. The roll 36 engages the emulsion side of the film 12, and its associated sprocket 74 is in driving engagement with the sprocket 75 carried by the idler 14.

At the end of the forward run from the supply reel, the location A of the processor engaging aperture 28 (FIG. 2) will be as shown in FIG. 21, beyond the hook 69 in the direction of the takeup reel. When the processor is erected, the hook 69 will lightly engage the film 12, and thus be adapted to engage the aperture 28 as the film 12 begins its movement back towards the supply reel 8 under the influence of a suitable drive applied to the reel 8 through its associated sprocket 22.

When the film begins its movement towards the supply reel, the film tension produced upon the jamming of the film as it reaches its end of the supply reel will be relaxed, thus allowing the bobulator roll 141 to return to its normal range of operating excursions. Since rewind is carried out at a convenient continuous processing speed, once film motion is established towards the supply reel, the bobulator roll 141 will essentially assume a fixed position within its normal range. The spring 150 is no longer engaged, as illustrated in FIG. 22, and the bell crank 151 is freed to return to its initial position under the influence of the spring 153.

The processor remains erected under the influence of the latch member 56 and hook 57. As the location A of the processor erecting aperture moves from the position shown in FIG. 21 to the position shown in FIG. 22, the hook 69 will be engaged. That will cause the lever 170 to be rotated and draw out the cable 169. The knife 168 will cut open the pod 169 and release processing composition into the chamber 166 for supply to the wick 164.

In the position illustrated in FIG. 22, the hook 69 has just been detached from the slot formed in the end 174 of the lever 170, and the lever begins its movement back to the position shown in FIG. 21 as suggested by the arrow in FIG. 22.

The coater 158 will continue to apply coating composition to the film 12 as long as it is moved onto the supply reel 8, and until the processing composition 177 is exhausted. That should be arranged to occur after the useful portion of the emulsion has been coated, and before the end of the roll is reached on the takeup reel.

As the film approaches its end on the takeup reel, the process termination notch 30 (FIG. 2) will be encountered by the hook 57, in the manner described in detail above in connection with FIG. 1, causing the hook 57 to be detached and releasing the latch member 56 to allow the housing 159 to return to its inactive position in engagement with the stop 161, in a manner sufficiently apparent from the above. The film 12 will then be freed to move backwards and forwards in the housing, as under the influence of the projector to intermittently advance it from the supply reel during projection, and then rewind it onto the supply reel after projection for storage and subsequent reuse.

Referring to FIGS. 23, 24 and 25, we have illustrated the interrelationship and cooperation between the cassette 1 in accordance with our invention and a suitable film drive and projection system with which the film and the casette can be processed and later projected for viewing. These operations can both be carried out immediately after the film is exposed, so that the photographer can project his results within a very short time after exposing the film.

In FIG. 23, the housing of the cassette 1 has been shown assembled with the base 2 having its side walls 3 in engagement with and connected to the walls 7 of the cover 5. As shown, the walls 3 and 7 are formed at the right side in FIG. 23 with an aperture indicated at 178 to expose the portion of the film 12 in the film gate, described above.

The film drive and projection apparatus is generally designated 179. In FIG. 23, its is fragmentarily shown at its interface with the cassette 1; it comprises a housing suggested by the dotted line 180, through which the parts cooperating with the input elements of the cassette 1 may protrude. Comparing FIGS. 23 and 24, these comprise a drive sprocket 181 adapted to cooperate with the drive sprocket 23 of the takeup reel 10, a corresponding drive sprocket 182 adapted to cooperate with the drive sprocket 22 of the supply reel 8, and a stop 183, shown schematically in FIGS. 24 and 25, adapted to engage the hub 21 of the snubber roll 17 (FIG. 1) to stop it against motion at times to be described.

A condensing system schematically indicated at 184 is adapted to register with the aperture 20 in the cover plate 6 for supplying light to the prism 19. Light for this purpose is furnished by a suitable projection lamp K, adapted to be energized when it is desired to project processed film.

A film drive pawl schematically indicated at 185 is adapted to engage the sprockets 26 in the film 12 (FIG. 2). The pawl 185 drives the film incrementally, as described above, under the influence of a conventional pawl drive mechanism schematically indicated at 186 through a cooperating drive linkage schematically indicated by the dotted line 187.

The prism 19 may be of any conventional construction, but for example, may be of the construction shown and described in copending U.S. application for letters patent Ser. No. 118,963, filed on Feb. 25, 1971 by Herbert A. Bing for Unique Prismatic Element And Projection System, and assigned to the assignee of our application. Basically, the prism 19 comprises a block of optical glass, or, preferably, of optically suitable, transparent synthetic resin, mounted in the housing of the cassette 1 in position to receive light through the aperture 20 from the collimator 184.

A mirror surface 188 is formed in any conventional manner at 45 degrees to the entering beam in the prism 19, and serves to reflect the light received from the projection lamp along paths normal to the plane of the film 12, and therethrough to a conventional projection lens 189 mounted in a barrel 190 affixed to the housing 180 and here shown as closed by a removable lens cap 191.

In practice, the cap 191 would be supplemented or replaced by a suitable conventional shutter assembly in the housing, adapted to close the projection aperture formed by the barrel 190, both to facilitate selected projection of the film 12, and also at times to close the housing 180 and thereby form a light-tight housing about the film when the cassette 1 is operatively connected to the housing, for reasons to appear.

FIG. 24 suggests the operative relationship between the cassette 1 and the film drive and projection apparatus 180 whereby these units can be assembled together to form a single light-tight housing about the film. The receptacle in the housing 180 to receive the cassette 1 as here been shown schematically simply as a ledge 192 adapted to receive the cassette 1.

When the cassette is received by the housing 180, the sprockets 182 and 181 are brought into registry with the sprockets 22 and 23, respectively; the stop 183 engages the snubber roll hub 21, when energized; and light may be supplied through the condenser 184 to the projection aperture 20 in the cassette, and thence through the film to the projection aperture 193 formed by the barrel of the lens 189, through which the optical image transmitted through the film may be focused on a suitable viewing screen 194. Suitable detachable retaining means, not shown, may be employed to hold the cassette 1 in light-sealing relationship with the housing 180. In practice, the retaining means 192 would comprise a generally rectanguloid recess formed in the housing 180, but has been here shown simply as a ledge to facilitate the explanation of the apparatus of our invention without digressing into detail beyond its scope.

The viewing screen 194 may either be a surface external to the apparatus 179, such as a tripod-mounted screen or the like, or it may be a diffusion screen mounted in opaque housing structure formed integral with the apparatus 179 for viewing through the opposite side. As will be apparent to those skilled in the art, the location of the cassette 1 in the housing, and the image inversion produced by the lens 189, together with the location of the screen and its nature as a reflecting screen or a transmission screen, will determine the orientation of the parts and the presence or absence of an external mirror or mirrors between the lens 189 and the viewing screen 194, so that the image will appear to the viewer in the correct position, i.e., upright and correctly oriented from left to right. These matters are well within the scope of the artisan, and will not be dwelled upon in detail.

FIG. 23 illustrates the construction of the takeup reel 10 in somewhat more detail, and thereby shows certain constructional features typical of any of those rotatable parts in the housing which are also required to provide external connections to the film drive and projection system 179. As illustrated, the reel 10 is provided with a lower flange 195 protruding beyond the coiled portion of the film 12 and terminating in a hub portion 196 adapted to cooperate with flanges 197 formed integral with the floor plate 4 to serve as a bearing for the reel 10. An upper flange 198 is formed on the spool 11, and on its upper surface there is formed a light-baffling flange 199 that serves to cooperate with a light-baffling annulus 200 formed on the cover plate 6.

The sprocket 23 is external to the cover 5, and protrudes therethrough by way of a central hub portion 201. The sprocket 23 is thus adapted to cooperate with a corresponding drive sprocket 181, the latter being driven by means schematically illustrated as a shaft 202, shown in full lines in FIG. 23, and as a dotted line in the corresponding location of FIG. 25.

FIG. 25 illustrates one mode of connection of the cassette 1 to suitable drive and projection apparatus, the latter being assumed to be located within the housing 180. As shown, the drive apparatus comprises a first slip clutch 203 schematically indicated as connected between the drive shaft 202 for the takeup spool drive sprocket 181 and an input drive shaft 204. The drive shaft 204 comprises the output shaft of a suitable d.c. takeup drive motor TM. As illustrated, the motor TM is adapted to be energized at times by current supplied from a source terminal at a potential B+ through the winding of the motor, and over a switch S1 in its closed position to ground. The ground described may be the negative return terminal of a battery having a supply terminal at the potential B+, or of course may be a conventional power supply energized by alternating current and converting the alternating current to direct current for use in driving the motor.

The drive sprocket 22 for the supply reel is adapted to be connected to the corresponding drive sprocket 182 of the film drive and projection apparatus 179. The sprocket 182 is connected to a drive shaft indicated schematically at 205 in FIG. 25. The shaft 205 is drivably connected through a slip clutch schematically indicated at 206 to the output shaft 207 of a d.c. supply drive motor SM. As schematically indicated, the motor SM is adapted to be engaged to drive the sprocket 22 when a switch S3 is closed to complete a circuit from the supply terminal at B+ through the winding of the motor to ground. A conventional speed control, here schematically shown as a variable series resistor 208, is provided to select either a suitable processing drive speed for the supply reel 22, or a convenient and preferably higher rewind speed for use in rewinding film after processing.

As schematically indicated in FIG. 25, the projection lamp K is adapted to be energized over a circuit path closed when a switch S2 is closed and extending from the supply terminal at B+ through the filament of the lamp K to ground. During projection, when the lamp K is energized, it is desired to stop the snubber roll 21. For this purpose, we have illustrated a solenoid generally designated 209 adapted to be energized in parallel with the projection lamp K.

When energized, the solenoid 209 drives the stop 183 into engagement with the snubber roll 21, causing it to be stopped during incremental advance of the film by the pawl 185 (FIG. 23). When the takeup motor TM is energized, but the projection lamp K and solenoid 209 are not energized, the film may be advanced onto the supply reel solely under the influence of the takeup drive sprocket 181 so that it can be moved to the end, as for the purposes of the apparatus of FIGS. 20–22, without interference by the drive pawl 185. That is, if the hub of the snubber roll 21 is not stopped, the takeup reel will continuously advance the film regardless of the actuation of the drive pawl 185, which will never catch up with the film to drive it during this mode of operation.

Operation of the apparatus of FIGS. 23–25 when a cassette has been inserted in the film drive and projection apparatus 179 will be generally apparent from the description above. However, operation will be briefly described on the assumption that the film is initially in the position shown in FIGS. 1, 8 and 20, having been exposed by the camera, and that the cassette 1 has been placed in engagement with the housing 180 on the ledge 192 in FIG. 24.

Operation may be begun by closing the switch S1 with the switches S2 and S3 open, to draw the film all onto the takeup reel. That initial step is not essential for the purposes of the systems of FIG. 1 or FIG. 8, but is necessary for the apparatus of FIG. 20 to cause the operation of the bobulator roll described. It may be desirable, however, in any event, to make sure that the film is advanced at least to the desired exposure end point that should have been established in the camera, or to insure that the location A (FIG. 1, for example), of the process initiation aperture in the film is correctly disposed with respect to the location of the process initiating hook 69.

When the film has been advanced as just described, the switch S1 is opened. Next, the switch S3 is closed with the lens cap 191 (FIG. 23) in position, or the shutter closed if such is provided, to form a light-tight housing about the film as it advances through the film gate during processing.

The supply spool sprocket 22 will then be driven to advance the film onto the supply reel, while the film is processed by any of the means described in connection with FIGS. 1, 8 or 20 above. When the film is substantially stored on the supply reel, and the processing operation has been completed, the switch S3 is opened.

Next, both the switches S1 and S2 can be closed to cause projection of the film, now processed. The lamp K and the snubber roll actuating solenoid 208 will now be energized while the takeup motor TM is energized, causing the film to be incrementally projected and advanced until operation is terminated by engagement of the pawl 185 with the elongated recess 27 (FIG. 2). Finally, the switches S1 and S2 can be opened, and the switch S3 closed, until the film has been returned to, and is substantially stored on, the supply reel, for storage and subsequent reuse.

FIG. 26 shows a modification of the apparatus of FIGS. 8 through 16 in which a drag coater is actuated in response to the increase in tension in the film at the end of the movement of the film onto the takeup reel. For this purpose, the tension-responsive assembly described above in connection with FIG. 20 is connected to the drag coater as schematically indicated in FIG. 26.

While we have described our invention with respect to the details of various illustrative embodiments thereof, many changes and variations will be apparent to those skilled in the art upon reading our description, and such can obviously be made without departing from the scope of the invention.

Having thus described our invention, what we claim is:

1. In combination with a light-tight housing, reversible film transport means mounted in said housing and adapted to move a strip of film over a predetermined path segment in either direction, a strip of film having ends connected to said film transport means for transport thereby, film processing means mounted in said housing adjacent said path segment, first actuating means located on said film for operatively connecting said processing means to said film in response to a first movement of said film by said transport means, and second actuating means located in said housing and responsive to a second movement of said film for disconnecting said processing means from said film.

2. The apparatus of claim 1, in which said first actuating means comprises detent engaging means located on said film, and in which said processing means comprises detent means operatively connected to said processing means for engagement by said detent means to operatively connect said processing means to said film.

3. The apparatus of claim 2, in which said detent engaging means comprises an edge of an aperture formed in said film, and said detent means comprises hook means detachably secured to said processing means for engagement with the edge of said aperture when said film is transported in a predetermined sense, said hook means first operatively connecting said processing means to said film upon engagement with said edge and then being detached from said processing means when the force exerted by said film reaches a predetermined value during transport of said film.

4. In combination with a light-tight housing containing a supply of unexposed photographic film having a leader initially extending out of and back into said housing through opposed light-baffled apertures, reversible film transport means connected to said film for moving it through said apertures in either direction over a substantial portion of its length, film processing means mounted in said housing, and control means mounted in said housing and responsive to said film transport means for operatively connecting said processing means to said film, said control means comprising means responsive to the tension in said film when said tension increases at one extreme of the movement of said film through said apertures for producing a control signal.

5. The apparatus of claim 4, in which said processing means comprises coating means, said coating means comprising a film engaging element movably mounted in said housing, means normally biasing said element to a first position out of contact with said film, and means responsive to said control signal for moving said film engaging element into contact with said film.

6. The apparatus of claim 5, in which said processing means comprises a roll coater, and in which said film engaging element comprises a coating roll.

7. The apparatus of claim 6, in which said processing means comprises a closed container, a supply of film processing composition in said container, and further comprising means attached to said film for opening said container to supply said composition to said coating roll when said film is transported past said processing means in a predetermined sense.

8. The apparatus of claim 5, in which said processing means comprises a drag coater having a coating nozzle normally out of engagement with said film, and in which said film engaging element comprises pressure pad means actuable to resiliently bias said film into coating contact with said nozzle.

9. The apparatus of claim 8, in which said processing means comprises a closed container, a supply of film processing composition in said container, and further comprising means attached to said film for opening said container to supply said composition to said nozzle when said film is transported past said nozzle in a predetermined sense.

10. In combination with a light-tight housing containing a supply of unexposed photographic film having a leader initially extending out of and back into said housing through opposed light-baffled apertures, reversible film transport means connected to said film for moving it through said apertures in either direction over a substantial portion of its length, film processing means mounted in said housing, and control means mounted in said housing and responsive to said film transport means for operatively connecting said processing means to said film, said processing means comprising a supply of film processing composition and coating means actuable to engage said film and apply said composition to said film, and said control means comprising a series of actuating means mounted on said film and adapted to sequentially actuate said processing means to sequentially engage said film, to coat said film with said processing composition, and to disengage said coating means from said film in response to movement of said film by said transport means.

11. The apparatus of claim 10, in which said processing means comprises a roll coater having a coating roll engageable with said film to coat said film with said coating composition, means responsive to actuation by a first of said actuating means for engaging said coating roll with said film, and means responsive to actuation by a second of said actuating means for disengaging said coater from said film when said composition is substantially exhausted.

12. The apparatus of claim 10, in which said processing means comprises a drag coater having a coating nozzle normally out of engagement with said film, pressure plate means responsive to actuation by a first of said actuating elements for resiliently engaging said film and urging said film into operable engagement with said nozzle, and release means responsive to actuation by a second of said actuating means for disengaging said pressure plate from said film and thereby disengaging said film from said nozzle.

13. The apparatus of claim 12, further comprising sealing means actuable to close said nozzle, and in which said release means comprises sequencing means responsive to actuation by said second element for sequentially disengaging said pressure plate from said film and actuating said sealing means to close said nozzle.

14. In combination with a photographic cassette comprising a light-tight housing, film supply means mounted in said housing and initially containing a strip of unexposed film having a first end connected to said supply means, takeup means mounted in said housing, said film having a leader extending from said supply means to a second end connected to said takeup means, film processing means located in said housing and initially containing a supply of film processing composition, said processing means being sequentially actuable from a first state in which said composition is sealed within said processing means and said processing means is out of contact with said film, to a second state in which said film is in contact with said processing means, to a third state in which said composition is unsealed to coat said film when said film is advanced past said processing means, and then to a fourth state in which said processing means is held out of contact with said film, first actuating means mounted in said housing and effective to actuate said processing means to its second state when said film is substantially all stored on said takeup means, second actuating means mounted in said housing and effective when said processing means is in its second state for actuating said processing means to its third state in response to movement of said film, and third actuating means mounted in said housing, effective when said processing means is in its third state and said film is substantially all stored by said supply means, and responsive to movement of said film toward said supply means to actuate said processing means to its fourth state.

15. The apparatus of claim 14, in which said first actuating means comprises a first detent element detachably connected to said processing means and detachable therefrom by a predetermined force, first engaging means on said film adjacent said first end in position to engage said first detent element and carry said first element with said film and thereby exert a force on said first element when said film advances toward said supply means, said exerted force reaching said predetermined force during the advance of said film toward said supply means, said first actuating means further comprising means responsive to a first movement of said first detent element with said film prior to the detachment of said first detent element for movement of said film into contact with said processing means, in which said second actuating means comprises means responsive to a second movement of said first detent element terminating beyond the end of said first movement and prior to the detachment of said first element for unsealing said composition to coat said film, and in which said third actuating means comprises a second detent element detachably mounted on said processing means, second detent engaging means located on said film in position to engage said second detent element when said film is advancing onto said supply means and is substantially all stored by said supply means, said second detent means being detached from said processing means during advancement of said film toward said supply means, and means responsive to movement of said second detent element with said film prior to the detachment of said second detent element for actuating said processing means to its fourth state.

16. The apparatus of claim 15, in which said processing means is a drag coater having a nozzle supplied with coating composition when said composition is unsealed, said nozzle being normally spaced from said film on one side of the film, and in which said means responsive to said first movement of said first detent element comprises a pressure plate located opposite said nozzle on the other side of said film and means for biasing said pressure plate into contact with said film to hold said film in slideable engagement with said nozzle.

17. The apparatus of claim 16, further comprising closure means initially mounted in a first position in said housing for movement between said first position, in which said nozzle is open, and a second position, in which said nozzle is closed by said closure means, and further comprising means responsive to movement of said second detent element beyond the movement effecting actuation of said processing means to its fourth state and prior to detachment of said second detent from said processing means for moving said closure means to its second position.

18. In combination with a photographic film cassette of the type comprising a light-tight housing containing film supply means and film takeup means each adapted to store a strip of film, a strip of unexposed and unprocessed film in said housing, said supply means initially storing substantially all of said strip of film, said film having one end connected to said takeup means and a leader passing out of said housing through a first light baffle, reentering said housing through a second light baffle spaced from said first baffle, and being connected at a second end of said film strip to said supply means, film processing means mounted in said housing adjacent said film in its path between said takeup and supply means and containing a supply of film processing composition, said processing means being sequentially actuable by first and second applied signals, said first signal actuating said processing means from an initial state in which said composition is stored in a sealed container and said processing means is out of contact with said film to a second state in which said container is opened to release said composition and brought into contact with said film to coat said film with said composition when said film is moved past said processing means, said second signal actuating said processing means to a third state out of contact with said film, first signal generating means located in said housing and responsive to movement of said film from said takeup means to said supply means when said film is substantially all stored on said takeup means for applying a first signal to said processing means, and second signal generating means located in said housing and responsive to substantially complete storage of said film by said supply means when said film processing means is in its second state for applying a second signal to said processing means.

19. The apparatus of claim 18 in which said first and second signal generating means each comprises a different first detent element formed integral with said film and a different second detent element, each of said second detent elements being associated with a different one of said first detent elements in a manner to be recited, each of said second detent elements being detachably mounted at different locations on said processing means adjacent said film for engagement with its associated first detent element at different times during movement of said film toward said supply means, said first detent element of said first signal generating means being located on said film on said leader between its associated second detent element and said takeup means when said film is substantially all stored by said takeup means and adapted to engage said associated element and carry it with said film after said engagement, thereby exerting a first force on said processing means, resilient means for urging said processing means out of contact with said film, means responsive to said first force for bringing said processor into contact with said film and opening said container, releasable means effective when said processor is brought into contact with said film to hold it in said contact, said first detent element of said second signal generating means being located on said film near said second end in position to engage its associated second detent element when said film is substantially all stored by said supply means and to carry said last recited associated second detent element with said film after said engagement, thereby exerting a second force on said processing means, and means responsive to said second force for releasing said releasable means, whereupon said resilient means urges said processor out of contact with said film.

20. The apparatus of claim 19, in which said second detent elements are each detached from said processing means and travel with said film when the forces exerted by said film on the second detent element exceed predetermined values in excess of said first force and said second force, respectively.

21. The apparatus of claim 19, in which each of said first detent elements comprises an aperture formed in said film, and in which each of said second detent elements comprises a resilient hook having a shank portion detachably secured to said processing means, an end portion adapted to engage an edge of said aperture when said film is advanced toward said supply means, and a deflecting portion intermediate said shank portion and said end portion for deflecting said end portion out of engagement with said film when said film moves toward said takeup means.

22. The apparatus of claim 19, in which said processing means is a roll coater having a coating roll brought into contact with said film and supplied with film processing composition when said container is opened.

23. The apparatus of claim 22, in which said second detent elements are each detached from said processing means in response to a predetermined force exerted by said film after engagement of the detent element with the film.

24. The apparatus of claim 19, in which said processing means is a drag coater having a nozzle brought into contact with said film by a pressure plate on the other side of said film resiliently biasing said film against said nozzle to be coated with processing composition when said container is opened.

25. The apparatus of claim 24, in which each of said second detent elements is detached from said processing means in response to a predetermined force exerted by said film after engagement of the detent element with the film.

26. In combination with a film cassette containing a supply of strip film having a first end, a second end, and a photosensitive coating on at least one side of said film over at least a portion intermediate said ends; film supply means; film takeup means connected to said first end and adapted to store and exchange film with said supply means; said supply means being connected to said second end and adapted to store and exchange film with said takeup means; said cassette comprising a light-tight housing containing said supply means and said takeup means and being pierced with opposed light-baffled apertures through which said film can pass from said supply means to said takeup means with clearance from said housing for cooperating with a camera, to expose said film to produce latent images on said film, and for cooperation with projection means, for projecting light through said film when said latent images are exposed and developed; said film being initially stored primarily by said supply means with a leader connected from said supply means to said first end through said first end through said apertures; said film, takeup means and supply means being responsive to first signals supplied by a camera to intermittently advance film from said supply means to said takeup means to allow a series of latent images to be formed in said photosensitive coating; said takeup means and said supply means being responsive to second signals supplied by projection means for advancing said film continuously from said takeup means to said supply means; said takeup means, said film and said supply means being responsive to third signals supplied by projection means for intermittently advancing said film from said supply means to said takeup means; film processing means located in said housing and containing a supply of processing composition coatable on said film for developing latent images formed on said photosensitive coating and responsive to an applied process initiation signal to coat said composition on said photosensitive coating when said film is advanced adjacent said processing means, and signal generating means located in said housing and responsive to movement of said film from said takeup means to said supply means when said film is primarily stored by said takeup means for applying a process initiation signal to said film processing means, said signal generating means comprising first means located on said film, second means detachably mounted on said processing means adjacent said film for engagement with said first means during movement of said film toward said supply means, said first means being located on said film in position to be engaged by said second when said film is substantially all stored by said takeup means, said second means travelling with said film after said engagement and thereby exerting force on said processing means until a predetermined force is reached sufficient to detach said second means for said processing means, and third means responsive to the force exerted on said second means prior to its detachment from said processing means for engaging said processing means with said film.

27. The apparatus of claim 26, in which said processing means comprises a roll coater mounted in said housing for movement between a first position out of contact with said film and a second position in coating contact with the side of said film carrying said photosensitive coating, resilient means biasing said coater toward its second position, said third means overcoming the bias of said resilient means in response to the force exerted by said film prior to disengagement of said second means, and further comprising detent means engaged by said processing means as said coater is brought into contact with said film to hold said coater in its second position.

28. The apparatus of claim 26, in which said first means comprises an aperture formed in said film and said second means comprises a resilient hook having a shank portion detachably secured to said processing means, an end portion adapted to engage the trailing portion of said aperture when said film is advanced toward said supply means, and a deflecting portion intermediate said shank portion and said end portion for deflecting said end portion out of engagement with said film when said film moves toward said takeup means.

29. The apparatus of claim 26, in which said processing means comprises a drag coater having a nozzle located on the side of said film bearing said photosensitive coating and a pressure plate located on the opposite side of said film, said pressure plate being initially biased out of contact with said film, and means responsive to the force exerted on said second means by said film prior to said disengagement of said second means for moving said pressure plate into position to urge said film slideably against said nozzle.

30. The apparatus of claim 29, in which said first means comprises the edge of an aperture formed in said film that is the trailing edge when said film moves toward said supply means and said second means comprises a hook detachably secured to said processing means, said hook being formed to be deflected from said aperture when said film moves toward said takeup means and to enter said aperture and engage said trailing edge when said film advances toward said supply means.

31. In combination with a photographic cassette of the type comprising a light-tight housing, a supply reel rotatably mounted in said housing and initially containing a roll of unexposed film having a first end connected to said supply reel, a takeup reel rotatably mounted in said housing, said film having a leader extending from said supply reel to a second end connected to said takeup reel, film processing means located in said housing and initially containing a supply of film processing composition, said processing means being sequentially actuable from a first stae in which said composition is sealed within said processing means and said processing means is out of contact with said film, to a second state in which said film is in contact with said processing means and said composition is unsealed to coat said film when said film is advanced past said processing means, and then to a third state in which said processing means is held out of contact with said film, said film being formed with first detent means adjacent said first end and second detent means formed adjacent said second end, first detent engaging means detachably secured to said processing means and adapted to engage said first detent means when said film is substantially all stored on said takeup reel and said film is then advanced onto said supply reel and to be detached from said processing means when a predetermined force is exerted by said detent means during movement of said film, means controlled by said first detent engaging means in response to the force exerted by said film prior to the disengagement of said first detent engaging means from said processing means for actuating said processing means from its first state to its second state, second detent engaging means detachably secured to said processing means and adapted to engage said second detent means when said film is advancing onto said supply reel and is substantially all stored thereon and to be detached from said processing means when a predetermined force is exerted by said second detent means during movement of said film, and means controlled by said second detent means in response to the force exerted by said film prior to the disengagement of said second detent engaging means from said processing means for actuating said processing means to its third state.

32. In combination with a photographic cassette of the type comprising a light-tight housing, a supply reel rotatably mounted in said housing and initially containing a roll of unexposed film having a first end connected to said supply reel, a takeup reel rotatably mounted in said housing, said film having a leader extending from said supply roll to a second end connected to said takeup reel, said cassette further comprising a film gate through which said film passes outside of said cassette in its path between said reels for cooperation with a camera, to impose latent images on said unexposed film, and with projection means, for transmitting light through at least a portion of the part of said film exposed by said gate, film processing means located in said housing and initially containing a supply of film processing composition, said processing means being sequentially actuable from a first state in which said composition is sealed within said processing means and said processing means is out of contact with said film, to a second state in which said film is in contact with said processing means and said composition is unsealed to coat said film when said film is advanced past said processing means, and then to a third state in which said processing means is held out of contact with said film, said film being formed with first detent means adjacent said first end and second detent means formed adjacent said second end, first unidirectional detent engaging means detachably secured to said processing means and adapted to engage said first detent means when said film is substantially all stored on said takeup reel and said film is then advanced onto said supply reel, said first engaging means being detached from said processing means when a predetermined force is exerted by said detent means during movement of said film, means controlled by said first detent engaging means in response to the force exerted by said film prior to the disengagement of said first detent engaging means from said processing means for actuating said processing means from its first state to its second state, second detent engaging means detachably secured to said processing means and adapted to engage said second detent means when said film is advancing onto said supply reel and is substantially all stored thereon, said second engaging means being detached from said processing means when a predetermined force is exerted by said second detent means during movement of said film, and means controlled by said second detent means in response to the force exerted by said film prior to the disengagement of said second detent engaging means from said processing means for actuating said processing means to its third state.

33. In combination with a photographic film cassette of the type comprising a light-tight housing containing film supply means and film takeup means each adapted to store a strip of film, a strip of unexposed and unprocessed film in said housing, said supply means initially storing substantially all of said strip of film, said film having one end connected to said supply means and a leader, means guiding said leader over a path including a segment having a length sufficient to accommodate means for coating said film with a processing composition, and said leader being connected at a second end of said film roll to said takeup means, film processing means mounted in said housing adjacent said film path segment between said takeup and supply means and containing a supply of film processing composition, said processing means being sequentially actuable by first and second applied signals, said first signal actuating said processing means from an initial state in which said composition is stored in a sealed container and said processing means is out of contact with said film to a second state in which said container is opened to release said composition and said processing means is brought into contact with said film to coat said film with said composition when said film is moved past said processing means, said second signal actuating said processing means to a third state out of contact with said film, first signal generating means located in said housing and responsive to movement of said film from said takeup means to said supply means when said film is substantially all stored on said takeup means for applying a first signal to said processing means, and second signal generating means located in said housing and responsive to substantially complete storage of said film by said supply means when said film processing means is in its second state for applying a second signal to said processing means.

34. In combination with a photographic cassette of the type comprising a light-tight housing, film supply means mounted in said housing and initially containing a strip of unexposed film having a first end connected to said supply means, film takeup means mounted in said housing said film having a leader extending from said supply means to a second end connected to said takeup means, film transport means for reversibly actuating said takeup and supply means each to store and exchange said film with the other, said cassette further comprising a film gate through which said film passes outside of said cassette in its path between said reels for cooperation with a camera, to impose latent images on said unexposed film, and with projection means, for transmitting light through at least a portion of the part of said film exposed by said gate, film processing means located in said housing and initially containing a supply of film processing composition, said processing means being sequentially actuable from a first and initial state in which said composition in sealed within said processing means and said processing means is out of contact with said film, to a second state in which said film is in contact with said processing means, to a third state in which said composition is unsealed to coat said film when said film is advanced past said processing means, and then to a fourth and final state in which said processing means is held out of contact with said film, first actuating means mounted in said housing and effective to actuate said processing means to its second state when said film is substantially all stored by said takeup means, second actuating means mounted in said housing and effective when said processing means is in its second state for actuating said processing means to its third state in response to movement of said film from said takeup means, and third actuating means mounted in said housing, effective when said processing means is in its third state and said film is substantially all stored by said supply means, and responsive to movement of said film from said takeup means to actuate said processing means to its fourth state.

35. In combination with a film cassette containing a supply of strip film having a first end, a second end, and a photosensitive coating on at least one side of said film over at least a portion intermediate said ends; film supply means; film takeup means connected to said first end and adapted to store and exchange film with said supply means; said film supply means being connected to said second end and adapted to store and exchange film with said takeup means; said cassette comprising a light-tight housing containing said supply means and said take-up means; guide means in said housing for guiding said film along a path between said supply means and said takeup means; said cassette further comprising a film gate through which said film can pass along a first segment of said path out of and back into said cassette for cooperating with a camera and a projector; said film being initially stored primarily by said supply means with a leader connected from said supply means to said first end over said path; said film, takeup meand and supply means being responsive to first signals supplied by a camera to intermittently advance film from said supply means to said takeup means to facilitate the formation of latent images in said photosensitive coating; said takeup means and said supply means being responsive to second signals supplied by projection means for advancing said film continuously from said takeup means to said supply means, said takeup means, said film and said supply means being responsive to third signals supplied by projection means for intermittently advancing said film from said supply means to said takeup means; film processing means located in said housing adjacent said film in a region along said path, said processing means containing a supply of processing composition coatable on said film for developing latent images formed in said photosensitive coating and responsive to an applied process initiation signal to engage said processing means with the side of said film bearing said photosensitive coating, and signal generating means located in said housing and actuated when said film is primarily stored by said takeup means for applying a process initiation signal to said film processing means, in which said guide means comprises bobulator means including a first film engaging element mounted in said housing and adapted to engage said film, first resilient means mounted in said housing and engaging said element and biasing it against said film in a direction to tend to lengthen said path, said first resilient means being compressed during intermittent advancement of said film to temporarily shorten said path and relaxed between intermittent advancements of said film and thereby permit said element to move backward and forward over a predetermined range, second resilient means mounted in said housing and adapted to engage said film engaging element in response to tension in said film tending to shorten said path beyond said predetermiend range permitted by deflection of said first resilient element in response to excess tension in said film produced when all of said film has been removed from said takeup means except said first end attached thereto, and means responsive to compression of said second resilient means for applying said process initiation signal to said film processing means.

36. In combination with a photographic cassette comprising a light-tight housing, film supply means mounted in said housing, film takeup means mounted in said housing, a strip of photographic film having a first end connected to said supply means and a second end connected to said takeup means, means mounted in said housing for guiding said film over a predetermined path between said takeup means and said supply means, said film strip being substantially longer than said path, said supply and takeup means being actuable to store and exchange substantially all of said strip of film each with the other, film processing means mounted in said housing and comprising an initially closed container, a supply of film processing composition in said container, and coating means effective when said container is opened and operable when effective to coat said composition on a film engaging said coating means and moving relative to said coating means, first process control means mounted in said housing and normally effective to maintain said coating means out of contact with said film and engagable to effect relative movement between said film and said coating means to bring them into operative coating engagement, second process control means mounted in said housing and actuable to open said container, third process control means mounted in said housing and operable to disengage said first process control means, first actuating means on said film strip in position to approach and pass said processing means over a predetermined first region of said path when said film is in motion and is primarily all stored by said takeup means, second actuating means operatively connected to said processing means in position to be engaged by said first actuating means as said first actuating means travels over said first region and responsive to said engagement to engage said first process control means and actuate said second process control means, third actuating means on said film strip in position to approach and pass said processing means over a second predetermined region of said path when said film is in motion and is primarily all stored by said supply means, and fourth actuating means operatively connected to said processing means in position to be engaged by said third actuating means as said third actuating means travels over said second region and responsive to said engagement to operate said third process control means.

37. The apparatus as claim 36, further comprising sequencing means engaged by said second actuating means for actuating said second process control means and then engaging said first process control means when said second actuating means is engaged by said first actuating means.

38. The apparatus of claim 36, further comprising sequencing means engaged by said second actuating means for engaging said first process control means and then actuating said second process control means when said second actuating means is engaged by said first actuating means.

39. The apparatus of claim 36, in which said processing means comprises a drag coater having an open nozzle through which processing composition is coated onto said film, closure means operable to close said nozzle, and sequencing means controlled by said fourth actuating means for operating said closure means after said third process control means is operated.

40. The apparatus of claim 36, in which said first and said third actuating means comprise edge portions of apertures formed in said film, and in which said second and said fourth actuating means comprise detent means detachably connected to said processing means and detached thereform by the force exerted by said film through said edge portions when the detents comprising said second and fourth actuating means reach the ends of said first and said second predetermined path regions, respectively.

41. The apparatus of claim 40, in which said second and fourth detent means comprise resilient hook means having shank portions detachably secured to said processing means and bight portions confronting said edges when said film travels toward said supply means for engagement therewith and being deflected from said film when said film travels toward said takeup means.

42. A film handling cassette comprising a housing, a strip of film stored in said housing, first normally inoperative means effective when rendered operative for applying processing composition to an incremental section of said film strip, second means, including a pair of spools to which opposite ends of said film strip are attached and between which said film strip may be transported, for progressively transporting said film strip transverse said first means, and third means for rendering said first means operative whereby substantially the entire length of said film strip may be treated with said processing composition, said third means comprising means for sensing the increase in tension on said film strip as it completes its movement from one spool onto the other, and means responsive to said tension sensing means for performing at least one function required to render said first means operative.

43. A film handling cassette comprising a housing, a strip of film stored within said housing, first normally inoperative means for applying processing composition to an incremental section of said film strip, second means responsive to externally mounted actuating means for progressively transporting said film strip transverse said first means, and third means for rendering said first means operative and subsequently rendering said first means inoperative whereby substantially the entire length of said film strip may be treated with said processing composition, said third means including means responsive to the actuation of said second means for performing a first function required to render said first means operative or inoperative in the course of said film strip transversing said first means in one direction and another function required to render said second means operative or inoperative in the course of said film strip transversing said first means in another direction.

44. A compact multipurpose film handling cassette comprising a housing configured to be first mounted in a camera to facilitate film exposure operations and then in another apparatus to facilitate film processing and projection operations, a strip of film stored within said housing, means forming a film exposure and projection station in said housing, a quantity of processing composition sufficient to treat substantially the entire length of said film strip located in said housing, coating means mounted in said housing for releasably storing said composition, means mounted in said housing and responsive to externally mounted actuating means for progressively transporting said film strip transverse said exposure and projection station and said coating means, means for effecting an operative relationship between said coating means and an incremental section of sad film strip, and means for subsequently discontinuing said operative relationship, said last-stated means at least in part being responsive to the actuation of said film strip transporting means.

45. The cassette of claim 44, wherein said means for effecting an operative relationship between said coating means and an incremental section of said film strip is at least in part responsive to the actuation of said film strip transporting means.

46. A compact multipurpose film handling cassette comprising a housing, a strip of film stored within said housing, means forming a film exposure and projection station in said housing, means mounted in said housing for releasably storing a quantity of processing composition sufficient to treat substantially the entire length of said film strip, means mounted in said housing and responsive to externally mounted actuating means for progressively transporting said film strip transverse said exposure and projection station and said processing composition storing means, means mounted in said housing for effecting an operative relationship between said processing composition and an incremental section of said film strip, and means for subsequently discontinuing said operative relationship, said last-stated means at least in part being responsive to the actuation of said film strip transporting means.

47. A compact multipurpose film handling cassette comprising a housing, a strip of film stored within said housing, means forming a film exposure and projection station in said housing, a quantity of processing composition in said housing sufficient to treat substantially the entire length of said film strip, coating means located in said housing for releasably storing said composition, means mounted in said housing and responsive to externally mounted actuating means for progressively transporting said film strip transverse said exposure and projection station and said processing composition storing means, means mounted in said housing for effecting an operative relationship between said processing composition and an incremental section of said film strip, and means for subsequently discontinuing said operative relationship, said means for effecting and discontinuing said operative relationship being at least in part responsive to the actuation of said film strip transporting means.

* * * * *